(12) United States Patent
Tolman et al.

(10) Patent No.: US 11,390,327 B2
(45) Date of Patent: Jul. 19, 2022

(54) SUBFRAME BRACE APPARATUS AND RELATED ASSEMBLIES FOR USE WITH VEHICLES

(71) Applicant: Toyota Motor Engineering & Manufacturing North America, INC., Plano, TX (US)

(72) Inventors: Kyler A. Tolman, Ann Arbor, MI (US); Alex B. Taylor, Chelsea, MI (US); Ryan M. Mahn, Lambertville, MI (US); Robert D. Smith, Dexter, MI (US)

(73) Assignee: Toyota Motor Engineering & Manufacturing North America, INC., Plano, TX (US)

( * ) Notice: Subject to any disclaimer, the term of this patent is extended or adjusted under 35 U.S.C. 154(b) by 156 days.

(21) Appl. No.: 16/848,461

(22) Filed: Apr. 14, 2020

(65) Prior Publication Data

US 2021/0316792 A1 Oct. 14, 2021

(51) Int. Cl.
*B62D 21/15* (2006.01)
*B62D 27/06* (2006.01)
*B62D 21/02* (2006.01)

(52) U.S. Cl.
CPC ........... *B62D 21/155* (2013.01); *B62D 21/02* (2013.01); *B62D 27/06* (2013.01)

(58) Field of Classification Search
CPC ......... B62D 21/155; B62D 21/02; B62D 7/06
See application file for complete search history.

(56) References Cited

U.S. PATENT DOCUMENTS

| 7,380,829 | B2 | 6/2008 | Kishima | |
| 8,851,520 | B2* | 10/2014 | Goellner | B62D 21/155 |
| | | | | 280/784 |
| 9,446,795 | B2 | 9/2016 | Jung et al. | |
| 9,751,565 | B2 | 9/2017 | Tatsuwaki et al. | |
| 9,926,012 | B2 | 3/2018 | Makowski et al. | |
| 10,259,503 | B2* | 4/2019 | Svensson | B62D 27/065 |
| 10,703,415 | B2* | 7/2020 | Alwan | B62D 21/152 |
| 2008/0047769 | A1 | 2/2008 | Haehnel | |

(Continued)

FOREIGN PATENT DOCUMENTS

| JP | 2017047761 A | * | 3/2017 | |
| JP | 2020050188 A | * | 4/2020 | |
| RU | 2673330 C2 | * | 11/2018 | B62D 21/11 |

*Primary Examiner* — Jonathan Ng
*Assistant Examiner* — Scott F. Underwood
(74) *Attorney, Agent, or Firm* — Oblon, McClelland, Maier & Neustadt, L.L.P.

(57) ABSTRACT

Subframe brace apparatus and related assemblies for use with vehicles are disclosed. A disclosed vehicle assembly includes a subframe of a vehicle, a vehicle body structure, and a brace attaching the subframe to the vehicle body structure. A body of the brace includes a first end coupled to the subframe and a second end coupled to the vehicle body structure. The first end of the body is configured to remain connected to the subframe during an offset frontal vehicle impact event in which the subframe applies a first load to the first end. The first end of the body is also configured to separate from the subframe during a full frontal vehicle impact event in which the subframe applies a second load to the first end.

19 Claims, 20 Drawing Sheets

(56) References Cited

U.S. PATENT DOCUMENTS

| | | | |
|---|---|---|---|
| 2013/0181481 A1* | 7/2013 | Baccouche | B62D 21/155 296/187.08 |
| 2013/0270029 A1* | 10/2013 | Young | B62D 21/155 180/274 |
| 2014/0062131 A1* | 3/2014 | Green | B62D 25/085 296/187.09 |
| 2015/0061272 A1* | 3/2015 | Watanabe | B62D 21/11 280/784 |
| 2015/0298741 A1* | 10/2015 | Winberg | B62D 21/155 296/187.09 |
| 2015/0314807 A1* | 11/2015 | Nusier | B62D 21/11 296/187.09 |
| 2016/0107695 A1* | 4/2016 | Lee | B62D 21/152 296/187.09 |
| 2017/0282974 A1* | 10/2017 | Craig | B60K 5/10 |
| 2019/0118863 A1* | 4/2019 | Hara | B62D 21/06 |
| 2019/0300059 A1 | 10/2019 | Komiya et al. | |

* cited by examiner

SUBFRAME BRACE APPARATUS AND RELATED ASSEMBLIES FOR USE WITH VEHICLES

FIELD OF THE DISCLOSURE

This disclosure relates generally to vehicles and, more particularly, to subframe brace apparatus and related assemblies for use with vehicles.

BACKGROUND

Motor vehicles typically employ braces to facilitate connecting different components together and/or providing support to a particular vehicle component such as a subframe. Often, automotive manufacturers perform controlled crash tests to ensure such vehicle components properly deform in a manner that would keep an occupant of a vehicle safe in a real-world collision.

SUMMARY

An aspect of the present disclosure includes a vehicle assembly. The vehicle assembly includes a subframe of a vehicle, a vehicle body structure, and a brace attaching the subframe to the vehicle body structure. A body of the brace includes a first end coupled to the subframe and a second end coupled to the vehicle body structure. The first end of the body is configured to remain connected to the subframe during an offset frontal vehicle impact event in which the subframe applies a first load to the first end. The first end of the body is also configured to separate from the subframe during a full frontal vehicle impact event in which the subframe applies a second load to the first end.

Another aspect of the present disclosure includes a subframe brace for a vehicle. The subframe brace includes a brace body. The brace body includes a first terminal portion coupled to a subframe of the vehicle and a second terminal portion, opposite to the first terminal portion, coupled to a body structure of the vehicle. The brace body configured to have (a) a first deformation mode in which the brace body deforms along a first body line and (b) a second deformation mode in which the brace body deforms along a second body line different from the first body line. In response to a first load applied to the first terminal portion by the subframe exceeding a first threshold load, the first deformation mode activates to reduce an amount of cabin intrusion associated with the vehicle. In response to a second load, different from the first load, applied to the first terminal portion by the subframe exceeding a second threshold load, the second deformation mode activates to reduce a deceleration pulse input to an occupant of the vehicle.

Another aspect of the present disclosure includes a vehicle. The vehicle includes a subframe, a body structure, and a brace attaching the subframe to the body structure. A body of the brace includes a first end coupled to the subframe and a second end coupled to the body structure. The first end of the body is configured to remain connected to the subframe during a first vehicle impact event in which the subframe applies a first load to the first end. The first end of the body is configured to separate from the subframe during a second vehicle impact event in which the subframe applies a second load to the first end different relative to the first load.

The foregoing paragraphs have been provided by way of general introduction, and are not intended to limit the scope of the following claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Figure 1:
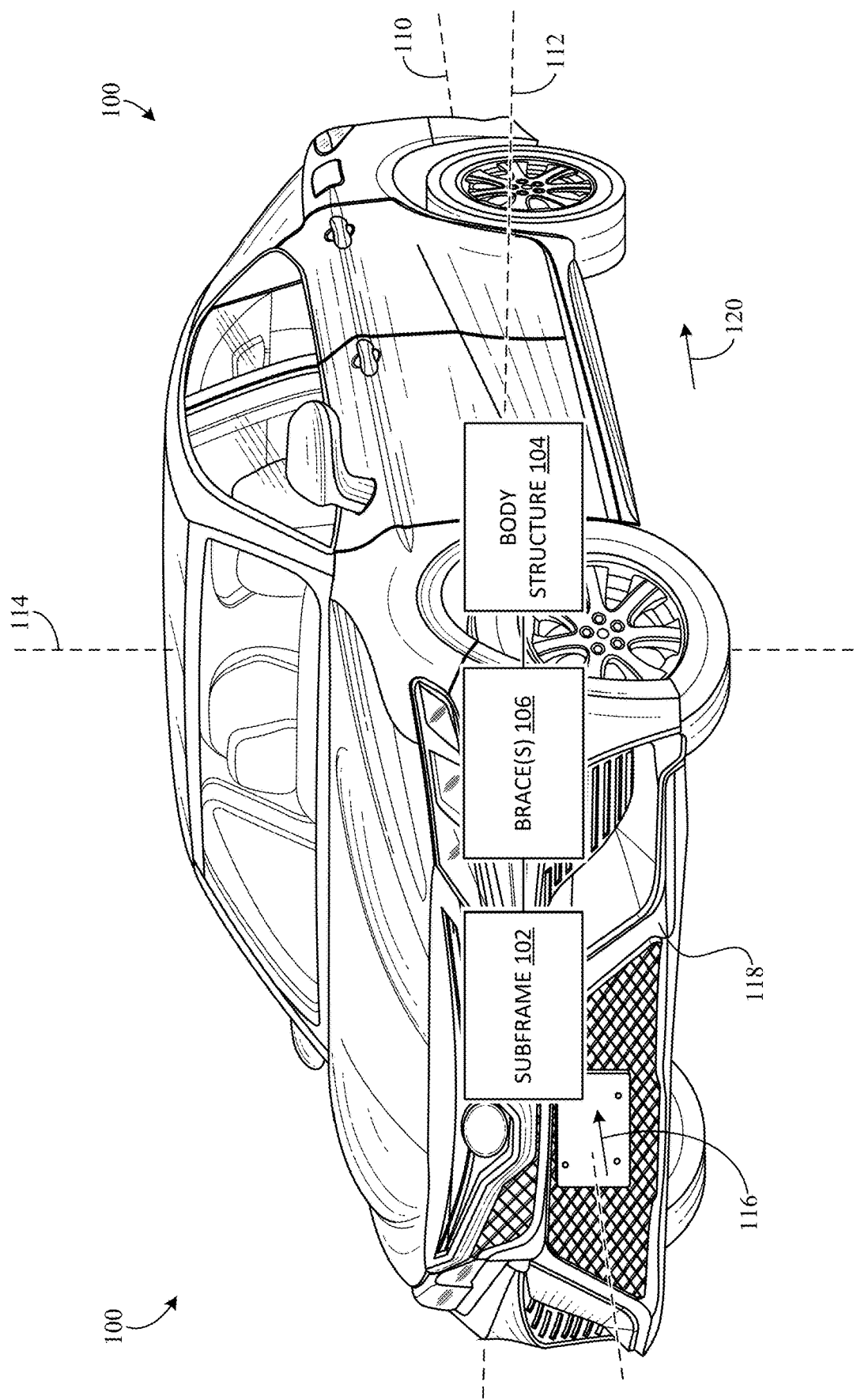
FIG. 1 illustrates an example vehicle in which examples disclosed herein can be implemented.

Some vehicles employ known structural components (e.g., subframes and/or braces) that are configured to separate from adjacent or supporting components during certain vehicle impact events. In particular, this separation can facilitate reducing a deceleration pulse input to a crash test dummy in a vehicle when a full frontal rigid barrier (FRB) crash test is performed on the vehicle, which improves vehicle safety. However, such a known structural component is configured to have the same mode for all frontal impacts. That is, these known structural components do not distinguish between separating in some modes and maintaining connection in others. As a result, in certain offset frontal crash scenarios, such as an offset deformable barrier (ODB) crash test, these known structural components fail to sufficiently counteract cabin intrusion of the vehicle such as body intrusion, toeboard intrusion, etc., which can pose substantial risks to a vehicle occupant. For example, such a known structural component may allow a frame rail of the vehicle to protrude into a vehicle cabin and/or otherwise cause substantial deformation in an area of the vehicle near an accelerator pedal. Subframe brace apparatus and related assemblies for use with vehicles are disclosed.

Examples disclosed herein provide a compact, cost-effective solution to advantageously control subframe motion of a vehicle subframe during any and/or all frontal impact scenarios. Some disclosed examples provide an example vehicle assembly including a subframe of a vehicle, a vehicle body structure (e.g., a uni-body structure), and at least one example brace (e.g., a subframe brace) attaching the subframe to the vehicle body structure. In particular, during a non-symmetric or offset frontal impact event (e.g., where only half or less of the vehicle is overlapping with a crash test structure), the desired function of the disclosed brace is to remain intact and/or connected to the subframe and the vehicle body structure, thereby reducing or eliminating an amount of cabin intrusion (e.g., toeboard intrusion) associated with the vehicle. In some examples, the disclosed brace is configured to absorb a certain amount (e.g., a maximum amount) of force and/or transmit a certain amount of force rearward to facilitate stopping the vehicle and preventing the cabin intrusion while the offset frontal impact event occurs. On the other hand, during a full frontal impact event (e.g., where more than half of the vehicle is overlapping with a crash test structure), the desired function of the disclosed brace is to separate (e.g., via tearing) from the subframe, thereby allowing for additional crumple space and reducing a deceleration pulse input to an occupant (e.g., a crash test dummy) of the vehicle. In some examples, the disclosed brace is configured to allow increased movement of the subframe relative to the body structure to ensure that a deceleration of the vehicle remains substantially below a certain threshold deceleration (e.g., a deceleration associated with injury) while the full frontal impact event occurs. The disclosed brace can achieve such functionality through a predefined directional stiffness of the brace that is provided by particularly sizing, shaping, structuring, and/or configuring the brace in accordance with the teachings of this disclosure, which will be discussed in greater detail below in connection with FIGS. 1-7, 8A, 8B, 8C, 9A, 9B, 9C, 10A, 10B, 10C, 10D, and 11-13. For example, the brace or a body thereof can be shaped to be substantially asymmetric and/or oblong. Further, to facilitate setting the predefined directional stiffness, the disclosed brace can be provided with one or more structural features that are positioned on and/or coupled to the body of the brace such as, for example, any of flanges (e.g., stiffening flanges), notches (e.g., stress relief notches), etc.

Generally speaking, in offset frontal crash modes characterized by relatively small overlap of the vehicle and an object or structure with which the vehicle collides (e.g., provided by performing an ODB crash test), cabin intrusion of the vehicle is of greater concern compared to deceleration pulse. Accordingly, the disclosed brace is configured to remain connected between the subframe and the vehicle body structure during these crash modes while disconnecting from the subframe (or the vehicle body structure) during full frontal crash modes characterized by a relatively large overlap of the vehicle and the structure (e.g., provided by performing a full FRB crash test). Thus, the technology disclosed herein can achieve separation in desired crash modes and maintain connection in the other crash modes such that no compromise is made between cabin intrusion and deceleration pulse, which would have otherwise been unattainable using the above-mentioned known structural components. As a result, examples disclosed herein improve vehicle safety for any and/or all such vehicle impact events.

In some examples, the disclosed brace or the body thereof is configured to have at least two different target deformation modes (e.g., bend modes). For example, the brace or the body thereof can have a first target deformation mode in which the body of the brace deforms (e.g., bends and/or folds) substantially along a first body line (e.g., a bend line and/or fold line extending across the body). The first target deformation mode, when activated by a first load applied to the brace by the subframe, is effective in reducing or eliminating the amount of cabin intrusion associated with the vehicle resulting from the offset frontal impact event. Further, the brace or the body thereof can have a second target deformation mode in which the body of the brace deforms (e.g., bends and/or folds) substantially along a second body line (e.g., a bend line and/or a fold line extending across the body) different from the first body line. The second target deformation mode, when activated by a second load applied to the brace by the subframe, is effective in reducing or eliminating the deceleration pulse associated with the vehicle resulting from the full frontal impact event. In particular, the second body line can be substantially closer to a certain attachment point of the brace. For example, the attachment point includes an aperture (e.g., a circular hole) in the body of the brace through which a fastener (e.g., a bolt) for coupling the brace to the subframe extends. Thus, deformation of the body occurs substantially closer to the attachment point during the full frontal impact event compared to the offset frontal impact event, which facilitates pulling out the fastener (i.e., fastener pullout) to cause separation of the brace and the subframe. In some examples, one or more of the disclosed structural features of the brace can be sized, shaped, structured, and/or otherwise configured to concentrate stress from the second load in one or more target areas of the of the brace body such as, for example, an area proximate to the attachment point.

Additionally, in such examples, the body of the brace is shaped to have (a) a first stiffness along a first axis corresponding to a direction of the first load and (b) a second stiffness along a second axis, different from the first axis, corresponding to a direction of the second load. In particular, the second stiffness is substantially greater than the first stiffness, which better enables the subframe to tear the brace, the body, or at least a portion thereof during the full frontal impact event. For example, as will be discussed further below, the subframe can be configured to urge a fastener (e.g., the fastener coupling the brace to the subframe) to move relative to the body of the brace such that the fastener (a) forms a tear on a portion of the body adjacent the fastener and (b) passes through the tear to disconnect the fastener from the body. As such, the second target deformation mode can include tearing (e.g., tensile tearing). In this manner, the brace and the subframe substantially separate from each other, for example, such that the brace ceases to transmit force(s) from the subframe to the body structure.

During the offset frontal impact event, the disclosed brace is loaded in an offset direction. Such loading can increase deformation of the brace. In particular, when the subframe applies the first load to the brace, the first load is directed substantially in the offset direction. In some examples, the first load may cause the brace to substantially twist in addition or alternatively to deforming along the first body line. On the other hand, during the full frontal impact event, the second load applied to the brace by the subframe may be directed substantially in an x-direction different from the offset direction. Accordingly, in some examples, the disclosed brace is configured to be stiffest in the x-direction (i.e., in a direction corresponding to the second load).

FIG. 1 is a view of an example vehicle (e.g., a motor vehicle such as a car, a truck, a van, a sport utility vehicle (SUV), etc.) 100 in which examples disclosed herein can be implemented. According to the illustrated example of FIG. 1, the vehicle 100 includes an example subframe 102, an example body structure (e.g., a uni-body structure) 104, and one or more example braces 106. The brace(s) 106 of FIG. 1 facilitate attaching the subframe 102 to the body structure 104 and/or providing support to the subframe 102. Each of the brace(s) 106 of FIG. 1 can be coupled between the subframe 102 and the body structure 104, for example, via one or more fasteners and/or one or more fastening methods or techniques. In particular, each of brace(s) 106 or a body thereof is configured to have different deformation modes (e.g., bending modes) that are associated with advantageously controlling motion of the subframe 102 during any and/or all frontal impact scenarios, which will be discussed greater detail below in connection with FIGS. 2-7, 8A, 8B, 8C, 9A, 9B, 9C, 10A, 10B, 10C, 10D, and 11-13.

In some examples, a primary one of the brace(s) 106 (i.e., a primary brace) includes a brace body configured to have (a) a first deformation mode in which the brace body deforms (e.g., bends and/or folds) along a first line (e.g., see the first body line 514 of FIG. 5) and (b) a second deformation mode in which the brace body deforms (e.g., bends and/or folds) along a second line (e.g., see the second body line 516 of FIG. 5) different from the first line. The first deformation mode is sometimes referred to as a first target deformation mode, and the second deformation mode is sometimes referred to as a second target deformation mode. In particular, in response to a first load applied to part (e.g., a terminal portion or end) of the primary brace by the subframe 102 exceeding a first threshold load, the first deformation mode activates to reduce or eliminate an amount of cabin intrusion associated with the vehicle 100. Such a loading condition can be provided, for example, during a non-symmetric or offset frontal vehicle impact event (i.e., a first vehicle impact event). On the other hand, in response to a second load, different from the first load, applied to the part of primary brace by the subframe 102 exceeding a second threshold load, the second deformation mode activates to reduce a deceleration pulse input to an occupant (e.g., a crash test dummy) of the vehicle 100. Such a loading condition can be provided, for example, during a full frontal vehicle impact event (i.e., a second vehicle impact event different from the first vehicle impact event). Further, the second deformation mode includes, for example, brittle deformation such as any of tearing, fracturing, cracking, etc. For example, when the second deformation mode of the brace body is activated, the brace body tears or forms a tear thereon, which facilitates disconnecting the primary brace from the subframe 102. When the primary brace and the subframe 102 are disconnected, the subframe 102 can move relative to the body structure 104 more easily without encountering resistance from the primary brace, which allows for more crumple space in addition to reducing the deceleration pulse.

In the example of FIG. 1, the subframe 102, which is sometimes referred to as a vehicle subframe, facilitates supporting an engine (e.g., a combustion engine) of the vehicle 100 and/or one or more components or assemblies thereof. For example, the engine can be positioned on and/or coupled to the subframe 102. In other words, the subframe 102 can be configured to hold the engine. The subframe 102 of FIG. 1 can be implemented, for example, using a lower subframe, etc., any other suitable subframe or frame structure, or a combination thereof.

In the example of FIG. 1, the body structure 104, which is sometimes referred to as a vehicle body structure, facilitates providing structural integrity to the vehicle 100. The body structure 104 of FIG. 1 can include, for example, a vehicle frame and/or one or more components associated with the frame such as frame rails. In some examples, the body structure 104 or part thereof can be implemented using an under reinforce arranged underneath the vehicle 100.

As shown in FIG. 1, the vehicle 100 is associated with a first axis (e.g., an x-axis) 110, a second axis (e.g., a y-axis) 112, and a third axis (e.g., a z-axis) 114 that are perpendicular to each other. The first axis 110 of FIG. 1 is a longitudinal axis associated with the vehicle 100, which is sometimes referred to as a roll axis. The second axis 112 of FIG. 1 is a lateral axis associated with the vehicle 100, which is sometimes referred to as a transverse or pitch axis. The third axis 114 of FIG. 1 is a vertical axis associated with the vehicle 100, which is sometimes referred to as a yaw axis.

In some examples, a certain vehicle impact event occurs in which the subframe 102 moves relative to the vehicle body structure 104. For example, during the vehicle impact event, an external structure (e.g., any of a substantially rigid barrier, a wall, etc.) imparts a relatively large or primary load 116 on a frontal portion 118 of the vehicle 100 in response to the vehicle 100 and the external structure colliding. In such examples, the subframe 102 can rotate relative to the body structure 104 and/or move toward the body structure 104 in a first direction (e.g., a rearward direction) 120. In particular, the vehicle impact event includes the offset frontal vehicle impact event, for example, provided by performing an ODB crash test on the vehicle 100. Additionally or alternatively, the vehicle impact event includes the full frontal vehicle impact event, for example, provided by performing a full FRB crash test on the vehicle 100. In any case, the primary load 116 of FIG. 1 has at least a first component (e.g., an x-component) directed in the first direction 120 or along the first axis 110.

Further, such a collision can cause the subframe 102 to transfer the primary load 116 or a portion thereof to the vehicle body structure 104 via the brace(s) 106. For example, each of the brace(s) 106 can be coupled between and/or interposed between the subframe 102 and the body structure 104 such that force and/or torque is/are transmittable through the brace(s) 106 from the subframe 102 to the body structure 104. As such, the subframe 102, the brace(s) 106, and the vehicle body structure 104, together, form and/or define a primary load path (i.e., a key or main load path) of the vehicle 100. As will be discuss further below, at least one of the brace(s) 106 is configured to control (e.g., maintain and/or break) the primary load path or part thereof during the vehicle impact event depending on one or more parameters (e.g., any of a magnitude, a direction, etc.) of the primary load 116, thereby controlling the movement of the subframe 102.

Figure 2:
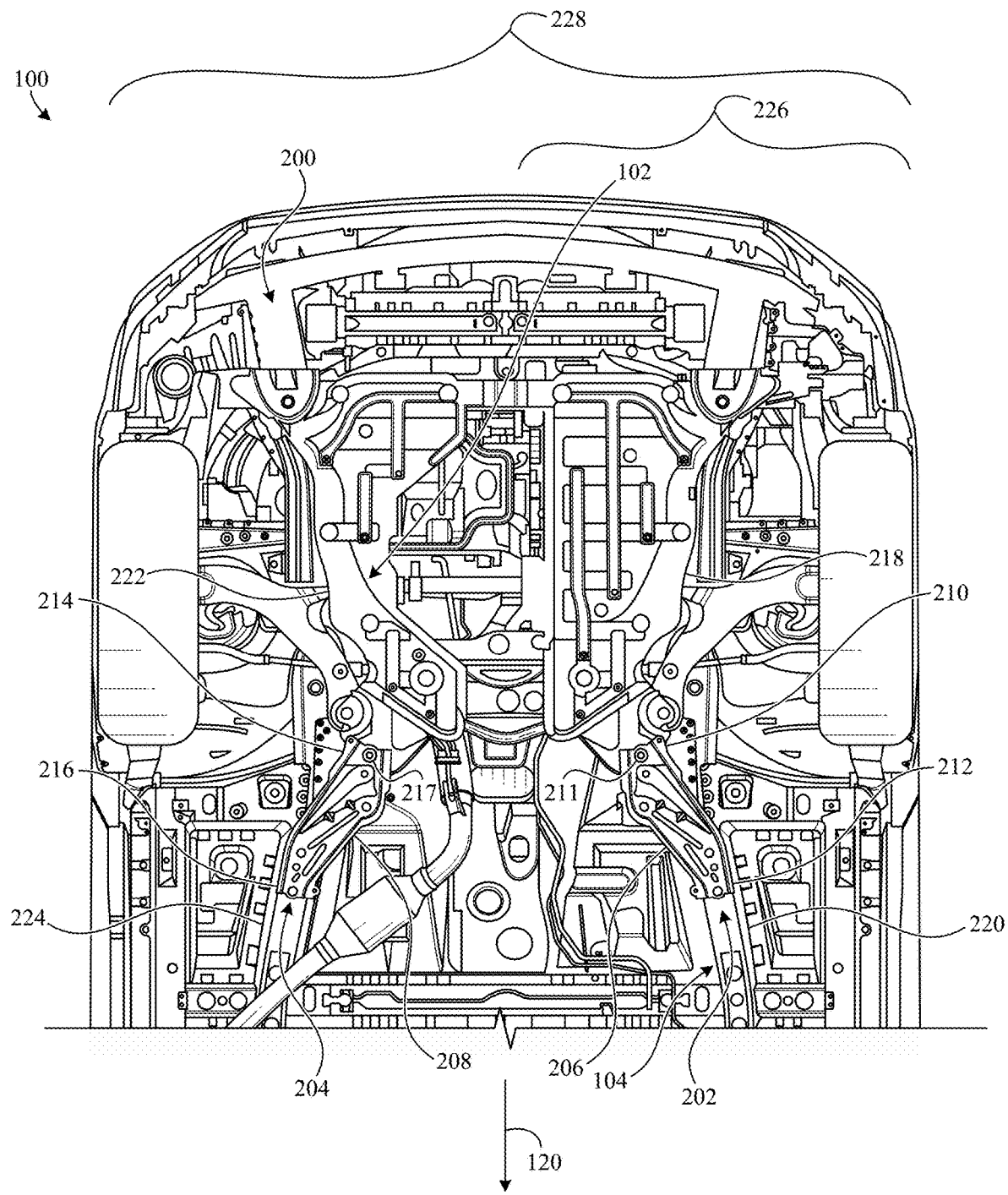
FIG. 2 is a bottom-view of the example vehicle of FIG. 1 and shows an implementation of an example vehicle assembly in accordance with the teachings of this disclosure.

FIG. 2 is a bottom-view of the example vehicle of FIG. 1 and shows a first implementation of an example vehicle assembly 200 in accordance with the teachings of this disclosure. According to the illustrated example of FIG. 2, the vehicle assembly 200 includes the subframe 102 of the vehicle 100, the vehicle body structure 104, a first example brace (e.g., a subframe brace) 202, and a second example brace (e.g., a subframe brace 204). The first brace 202 and/or the second brace 204 can correspond to the brace(s) 106 shown in FIG. 1 (e.g., the primary brace previously described) and/or can be used to implement any one or more of the brace(s) 106 shown in FIG. 1. Thus, aspects described in connection with the first brace 202 and/or the second brace 204 can likewise apply to the brace(s) 106 shown in FIG. 1. In the example of FIG. 2, each of the first and second braces 202, 204 is attaching the subframe 102 to the body structure 104. In some examples, each of the first and second braces 202, 204 includes a body 206, 208 (sometimes referred to as a brace body) extending substantially from the subframe 102 to the body structure 104. For example, the first brace 202 of FIG. 2 includes a first brace body 206, and the second brace 204 of FIG. 2 includes a second brace body 208.

In the illustrated example of FIG. 2, the first brace body 206 includes a first terminal portion (e.g., a first end of the first brace body 206) 210 configured to receive the subframe 102 and a second terminal portion (e.g., a second end of the first brace body 206) 212 configured to receive the body structure 104. In some examples, the second terminal portion 212 is positioned on the first brace body 206 opposite relative to the first terminal portion 210. The first and second terminal portions 210, 212 can include, for example, respective ends (e.g., opposite ends) of the first brace body 206. As such, the first terminal portion 210 can form and/or define a first end of the first brace body 206, and the second terminal portion 212 can form and/or define a second end of the first brace body 206 opposite to the first end. Additionally or alternatively, each of the first and second terminal portions 210, 212 can include a part of the first brace body 206 positioned proximate to and/or adjacent the first or second end of the first brace body 206.

The first terminal portion 210 of FIG. 2 is coupled to the subframe 102. Further, the second terminal portion 212 of FIG. 2 is coupled to the body structure 104. Such coupling can be achieved, for example, via one or more fasteners or fastening devices and/or one or more fastening methods or techniques. In some examples, one or more primary fasteners (e.g., any of bolts, lugs, nuts, screws, etc.) are advantageously used to couple the braces 106, 202, 204 to the subframe 102, which can facilitate separating the braces 106, 202, 204 from the subframe 102 during a certain vehicle impact event, as will be discussed further below. For example, the vehicle assembly 200 of FIG. 2 includes a first primary fastener 211 coupling the first terminal portion 210 of the first brace body 206 to the subframe 102. In particular, the first terminal portion 210 of FIG. 2 is configured to remain connected to the subframe 102 during a first vehicle impact event (e.g., the offset frontal vehicle impact event previously described) in which the subframe 102 applies a first load (e.g., the load 302 shown in FIG. 3) to at least the first terminal portion 210. On the other hand, the first terminal portion 210 of FIG. 2 is configured to separate (e.g., via tearing) from the subframe 102 during a second vehicle impact event (e.g., the full frontal vehicle impact event previously described) in which the subframe 102 applies a second load (e.g., see the load 402 shown in FIG. 4) to the first terminal portion 210 different relative to the first load. Accordingly, the first brace 202 of FIG. 2 can effectively counteract undesired effects associated with the first vehicle impact event by maintaining the primary load path of the vehicle 100 during the first vehicle impact event. Additionally or alternatively, the first brace 202 of FIG. 2 can effectively counteract undesired effects associated with the second vehicle impact event by breaking the primary load path or part thereof during the second vehicle impact event.

In the illustrated example of FIG. 2, the second brace body 208 includes a third terminal portion (e.g., a first end of the second brace body 208) 214 configured to receive the subframe 102 and a fourth terminal portion (e.g., a second end of the second brace body 208) 216 configured to receive the body structure 104, similar to the first brace body 206. In some examples, the fourth terminal portion 216 is positioned on the second brace body 208 opposite relative to the third terminal portion 214. The third and fourth terminal portions 214, 216 can include, for example, respective ends (e.g., opposite ends) of the second brace body 208. As such, the third terminal portion 214 can form and/or define a first end of the second brace body 208, and the fourth terminal portion 216 can form and/or define a second end of the second brace body 208 opposite to the first end. Additionally or alternatively, each of the third and fourth terminal portions 214, 216 can include a part of the second brace body 208 positioned proximate to and/or adjacent the first or second end of the second brace body 208.

The third terminal portion 214 of FIG. 2 is coupled to the subframe 102. Further, the fourth terminal portion 216 of FIG. 2 is coupled to the body structure 104. As previously described, such coupling can be achieved, for example, via one or more fasteners or fastening devices and/or one or more fastening methods or techniques. In some examples, the vehicle assembly 200 can also include a second primary fastener 217 coupling the third terminal portion 214 of the second brace body 208 to the subframe 102. Similar to the first terminal portion 210, the third terminal portion 214 of FIG. 2 can be configured to remain connected to the subframe 102 during the first vehicle impact event. Further, the third terminal portion 214 of FIG. 2 can be configured to separate (e.g., via tearing) from the subframe 102 during the second vehicle impact event.

In some examples, a first side portion 218 of the subframe 102 is connected to a first support member 220 of the body structure 104 via the first brace 202, which is shown in FIG. 2. That is, the first brace 202 or the first body 206 thereof is coupled between and/or interposed between the first side portion 218 and the first support member 220. When connected together in such a manner, force and/or torque is/are transmittable through the first brace 202 from the subframe 102 to the body structure 104. Additionally or alternatively, in some examples, a second side portion 222 of the subframe 102 is similarly connected to a second support member of 224 of the body structure 104 via the second brace 204, which is also shown in FIG. 2. That is, the second brace 204 or the second body 208 thereof is coupled between and/or interposed between the second side portion 222 and the second support member 224. Accordingly, when connected together in such a manner, force and/or torque is/are transmittable through the second brace 204 from the subframe 102 to the body structure 104. In such examples, the second side portion 222 is positioned on a body of the subframe 102 opposite relative to the first side portion 218.

In the example of FIG. 2, the first and second side portions 218, 222 of the subframe 102 are adjacent each other and coupled together. In some examples, the subframe 102 is a one-piece component such that the first and second side portions 218, 222 are integral. On the other hand, in some examples, the subframe 102 is implemented differently. For example, the subframe 102 can be a multi-piece component including the first side portion 218, the second side portion 222, and/or one or more other components that can be assembled. The first side portion 218, the second side portion 222, and/or, more generally, the subframe 102 of FIG. 2 can be constructed of one or more materials having suitable properties (e.g., a relatively high strength and/or rigidity) such as, for example, one or more metals (e.g., steel, carbon steel, iron, aluminum, etc.), one or more composites, etc., any other material(s) suitable for use with vehicles, or a combination thereof.

In some examples, to increase strength and/or rigidity of the body structure 104, the body structure 104 can include one or more support members (e.g., frame rails) each configured to receive a brace 106, two of which are shown in this example (i.e., the first support member 220 and the second support member 224). In the example of FIG. 2, the first support member 220 of the body structure 104 is coupled to the second terminal portion 212 and extends away from the second terminal portion 212 along the vehicle 100 in the first direction 120. Similarly, the second support member 224 of the body structure 104 is coupled to the third terminal portion 216 and extends away from the third terminal portion 216 along the vehicle 100 in the first direction 120. The support member(s) 220, 224 of FIG. 2 can be implemented, for example, using one or more frame rails. For example, the first support member 220 of FIG. 2 includes a first frame rail, and the second support member 224 of FIG. 2 includes a second frame rail.

Although FIG. 2 depicts the two braces 202, 204, in some examples, a different number (e.g., one or more than two) of such braces 106 can be used to similarly attach the subframe 102 to the body structure 104. For example, the vehicle assembly 200 includes only the first or second brace 202, 204. In another example, the vehicle assembly 200 includes the first brace 202, the second brace 204, and/or one or more other such braces.

In some examples, when the vehicle 100 collides with the external structure previously described, the external structure overlaps with a first width 226 of the vehicle 100. Such overlap can occur during the first vehicle impact event. In such examples, the first width 226 is, for example, 50% or less of a total width of the vehicle 100. Additionally or alternatively, in some examples, the external structure overlaps with a second width 228 of the vehicle 100 greater than the first width 226. Such overlap can occur during the second vehicle impact event. In such examples, the second width 228 is, for example, greater than 50% of the total width of the vehicle 100 including 100% of the width.

Figure 3:
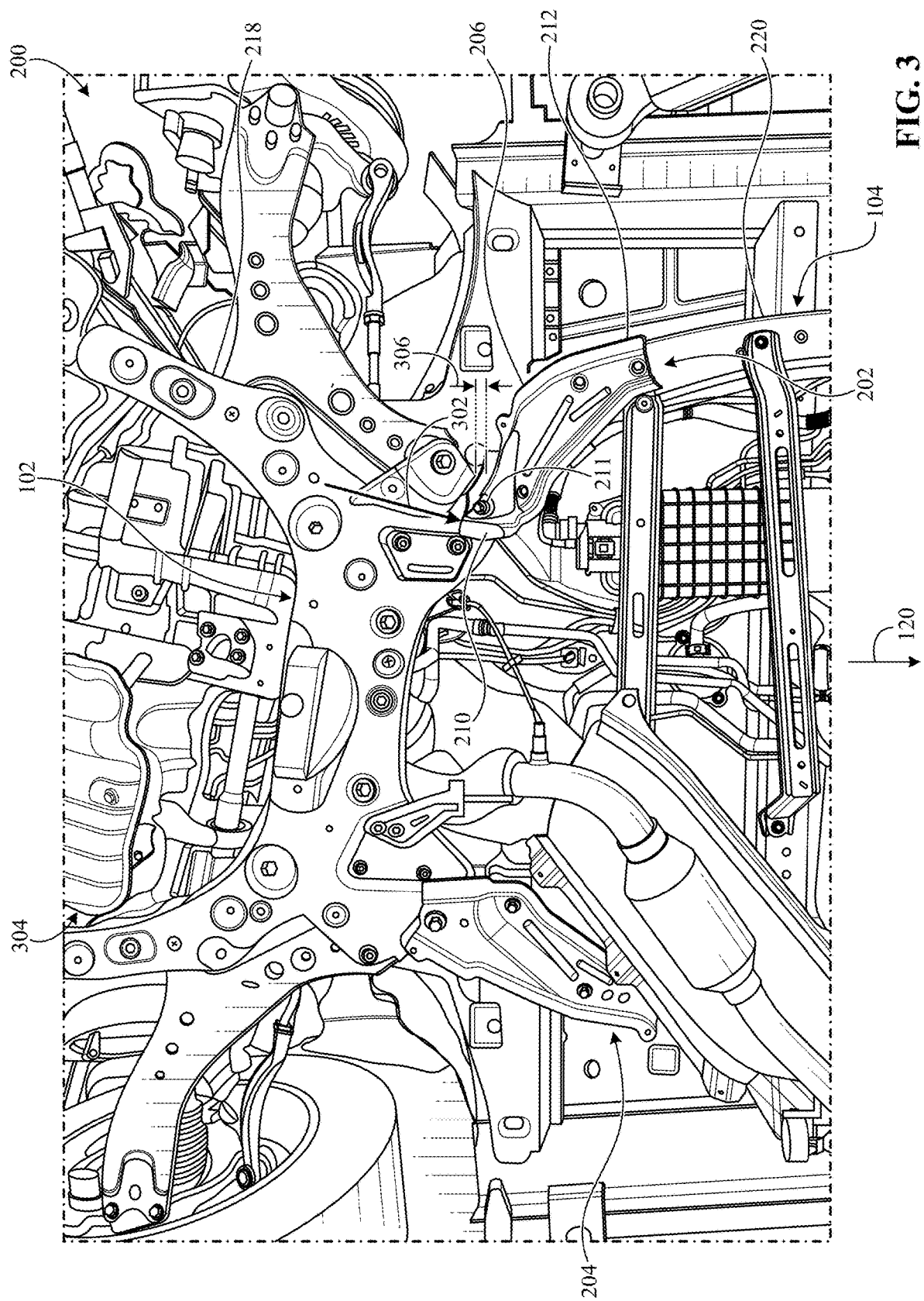
FIGS. 3 and 4 are other bottom-views of the example vehicle of FIG. 1 and show example deformation characteristics associated with an example vehicle assembly resulting from different vehicle impact events.

FIG. 3 is another bottom-view of the example vehicle of FIG. 1 and shows example deformation characteristics associated with the vehicle assembly 200 resulting from the first vehicle impact event. Each of the first and second braces 202, 204 of FIG. 3 is substantially coupled and/or connected between the subframe 102 and the body structure 104. For example, the first terminal portion 210 is coupled (e.g., via the first primary fastener 211) to the first side portion 218 of the subframe 102, and the second terminal portion 212 is coupled to the first support member 220.

According to the illustrated example of FIG. 3, the primary load 116 or a portion thereof is transferred to the subframe 102 during the first vehicle impact event, thereby causing the subframe 102 to move and/or rotate relative to (e.g., toward) the body structure 104. In some examples, the subframe 102 of FIG. 3 applies a first load 302 to the first brace 202 thereof during the first vehicle impact event, a magnitude and/or a direction of which is based on one or more parameters of the primary load 116 specific to the first vehicle impact event. For example, the first load 302 or a portion thereof is transmitted through the first primary fastener 211 from the subframe 102 to the first terminal portion 210 of the first brace body 206. The first load 302 can cause at the first brace 202 or the body 206 thereof to substantially deform. In particular, while the first brace 202 may substantially deform, each of the first and second braces 202, 204 of FIG. 3 remains substantially intact during the first vehicle impact event such that the primary load path of the vehicle 100 is maintained. In such examples, the first brace 202 of FIG. 3 absorbs a certain amount (e.g., a maximum amount) of the first load 302 and/or transmits a certain amount of first load 302 rearward to stop the vehicle 100 and prevent the cabin intrusion while the first vehicle impact event occurs.

According to the illustrated example of FIG. 3, no tearing occurs in the first brace 202 (or the second brace 204) during the first vehicle impact event. Further, the first brace 202 of FIG. 3 substantially reduces cabin deformation associated with an engine (e.g., a combustion engine) 304 of the vehicle 100 that is held by the subframe 102. For example, the first brace 202 or the body 206 thereof allows the first side portion 218 of the subframe 102 to move toward the first support member 220 in the first direction 120 across a relatively small distance 306 (i.e., a first distance), which is sometimes referred to as a stroke associated with the first vehicle impact event. In some examples, the first brace 202 of FIG. 3 reduces (e.g., minimizes) such a stroke for the first vehicle impact event.

In some examples, the first brace body 206 of FIG. 3 (or the second brace body 208) is configured to have the first and second target deformation modes previously described in connection with the primary brace. In particular, the first load 302 activates the first target deformation mode, for example, if the first load 302 or the magnitude thereof is greater than or equal to the first threshold load. The first threshold load includes, for example, a value corresponding to a relatively large load (e.g., any of a compressive load, a tensile load, a shear load, etc.) associated with causing plastic deformation. For example, the first threshold load or the value thereof can be any of 5,000 newtons (N), 10,000 N, 50,000 N, etc. Accordingly, the first threshold load is sometimes referred to as a first failure load associated with a brace 106.

While FIG. 3 depicts the subframe 102 applying the first load 302 to the first brace 202, in some examples, the subframe 102 can likewise apply the first load 302 or a similar load to the second brace 204 during the first vehicle impact event. Further, although certain aspects have been depicted in connection with the first brace 202 of FIG. 3, in some examples, such aspects likewise apply to one or more other braces of the vehicle assembly 200 such as, for example, the second brace 204 of FIG. 3.

Figure 4:
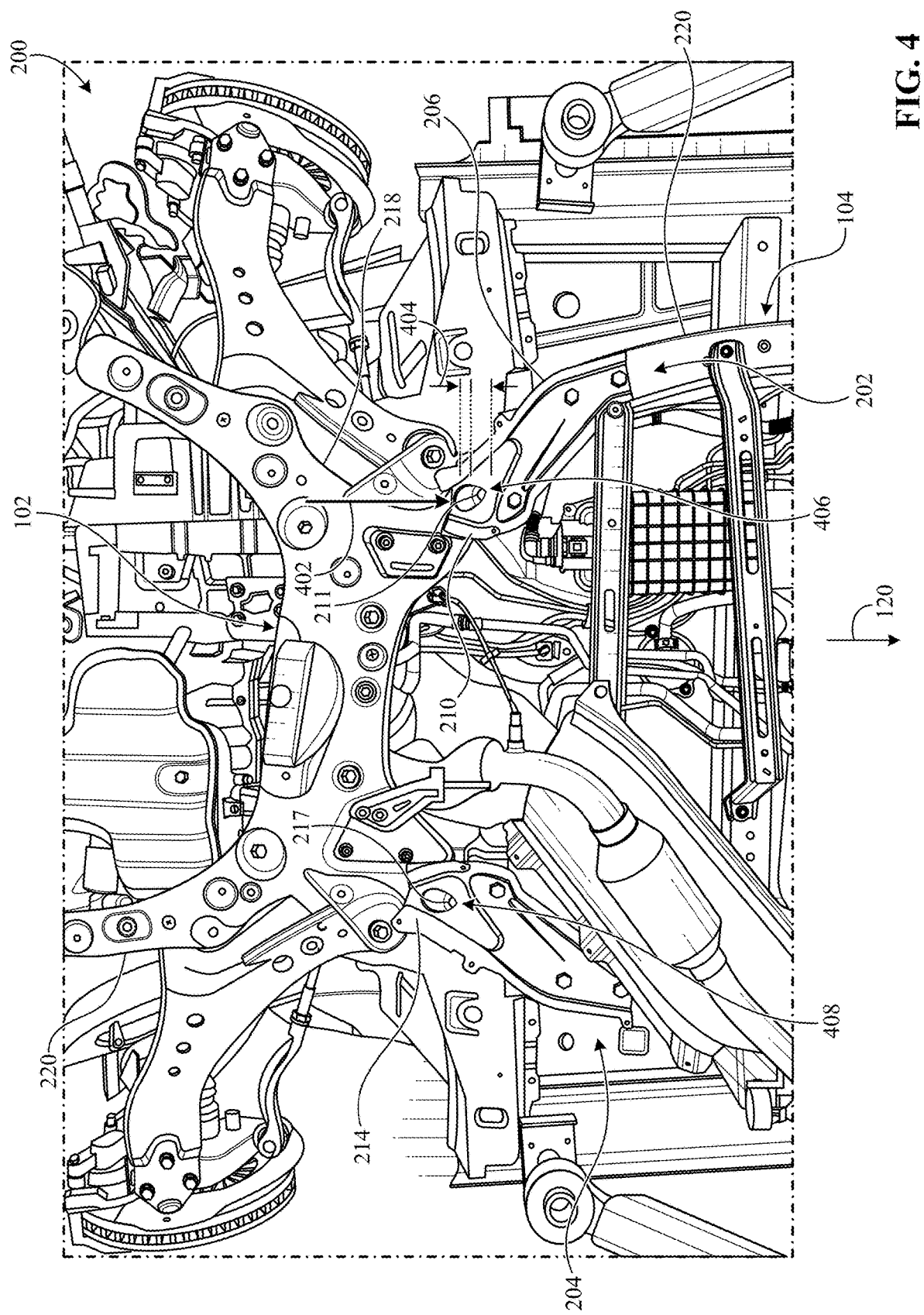

FIG. 4 is another bottom-view of the example vehicle of FIG. 1 and shows different example deformation characteristics associated with the vehicle assembly 200 resulting from the second vehicle impact event. Each of the first and second braces 202, 204 of FIG. 4 is connected and/or coupled to the vehicle body structure 104. However, unlike of the illustrated example of FIG. 3, each of the first and second braces 202, 204 of FIG. 4 is disconnected from the subframe 102. For example, in the illustrated example of FIG. 4, the first terminal portion 210 of the first brace 202 is substantially separated from the first side portion 218 of the subframe 102, and the third terminal portion 214 of the second brace 204 is substantially separated from the second side portion 222 of the subframe 102.

According to the illustrated example of FIG. 4, the primary load 116 or a portion thereof is transferred to the subframe 102 during the second vehicle impact event, thereby causing the subframe 102 to move and/or rotate relative to (e.g., toward) the body structure 104. In some examples, the subframe 102 of FIG. 4 applies a second load 402 to the first brace 202 during the second vehicle impact event, a magnitude and/or a direction of which is based on one or more parameters of the primary load 116 specific to the second vehicle impact event. For example, the second load 402 or a portion thereof is transmitted through the first primary fastener 211 from the subframe 102 to the first terminal portion 210 of the first brace body 206. The second load 402 of FIG. 4 is different from the first load 302 of FIG. 3. The second load 402 can cause the first brace 202 to substantially deform, similar to the first load 302. In particular, in contrast to the illustrated example of FIG. 3, the first brace 202 and/or the second brace 204 of FIG. 4 do not remain substantially intact during the second vehicle impact event such that the primary load path of the vehicle 100 or part thereof breaks. In such examples, the first brace 202 and/or the second brace 204 allow(s) increased movement of the subframe 102 relative to the body structure 104 during the second vehicle impact event, which ensures that a deceleration of the vehicle 100 does not exceed a certain threshold deceleration (e.g., a deceleration associated with injury). For example, the first brace 202 or the body 206 thereof allows the first side portion 218 of the subframe 102 to move toward the first support member 220 in the first direction 120 across a relatively large distance 404 (i.e., a second distance) relative to the first distance 306, which is sometimes referred to as a stroke associated with the second vehicle impact. In some examples, the first brace 202 of FIG. 4 increases (e.g., maximizes) such a stroke for the second vehicle impact event.

According to the illustrated example of FIG. 4, tearing occurs in the first brace 202 during the second vehicle impact event. In some examples, the subframe 102 or the first side portion 218 thereof urges the first primary fastener 211 to move relative to the first body 206 such that the first primary fastener 211(a) forms and/or propagates a first tear 406 on a portion of the first body 206 adjacent the first primary fastener 211 and (b) passes through the first tear 406 to disconnect the first primary fastener 211 from the first body 206. As a result, in such examples, the first primary fastener 211 substantially disconnects from the first brace body 206 (e.g., while remaining connected to the subframe 102), and, consequently, the first brace 202 substantially disconnects from the subframe 102. In this manner, the vehicle assembly 200 allows for additional or increased crumple space and/or reduces a related deceleration pulse input to the vehicle occupant as the subframe separates from the first brace 202. Additionally or alternatively, such tearing can likewise occur in the second brace 204 during the vehicle impact event. As shown in FIG. 4, a second tear 408 is positioned on a portion of the second body 208 adjacent the second primary fastener 217.

In some examples (e.g., where at least one of the first or second brace bodies 206, 208 of FIG. 4 is configured to have the first and second target deformation modes), the second load 402 activates the second target deformation mode, for example, if the second load 402 or the magnitude thereof is greater than or equal to the second threshold load. The second threshold load includes, for example, a value corresponding to a relatively large load (e.g., any of a compressive load, a tensile load, a shear load, etc.) associated with causing plastic deformation. Accordingly, the second threshold load is sometimes referred to as a second failure load associated with a brace 106. In some examples, the second threshold load is substantially equal to the first threshold load. However, the first and second threshold loads can be different.

While FIGS. 2-4 depict certain aspects in connection with the first and second braces 202, 204, in some examples, such aspects likewise apply to one or more other braces of the vehicle assembly 200.

Figure 5:
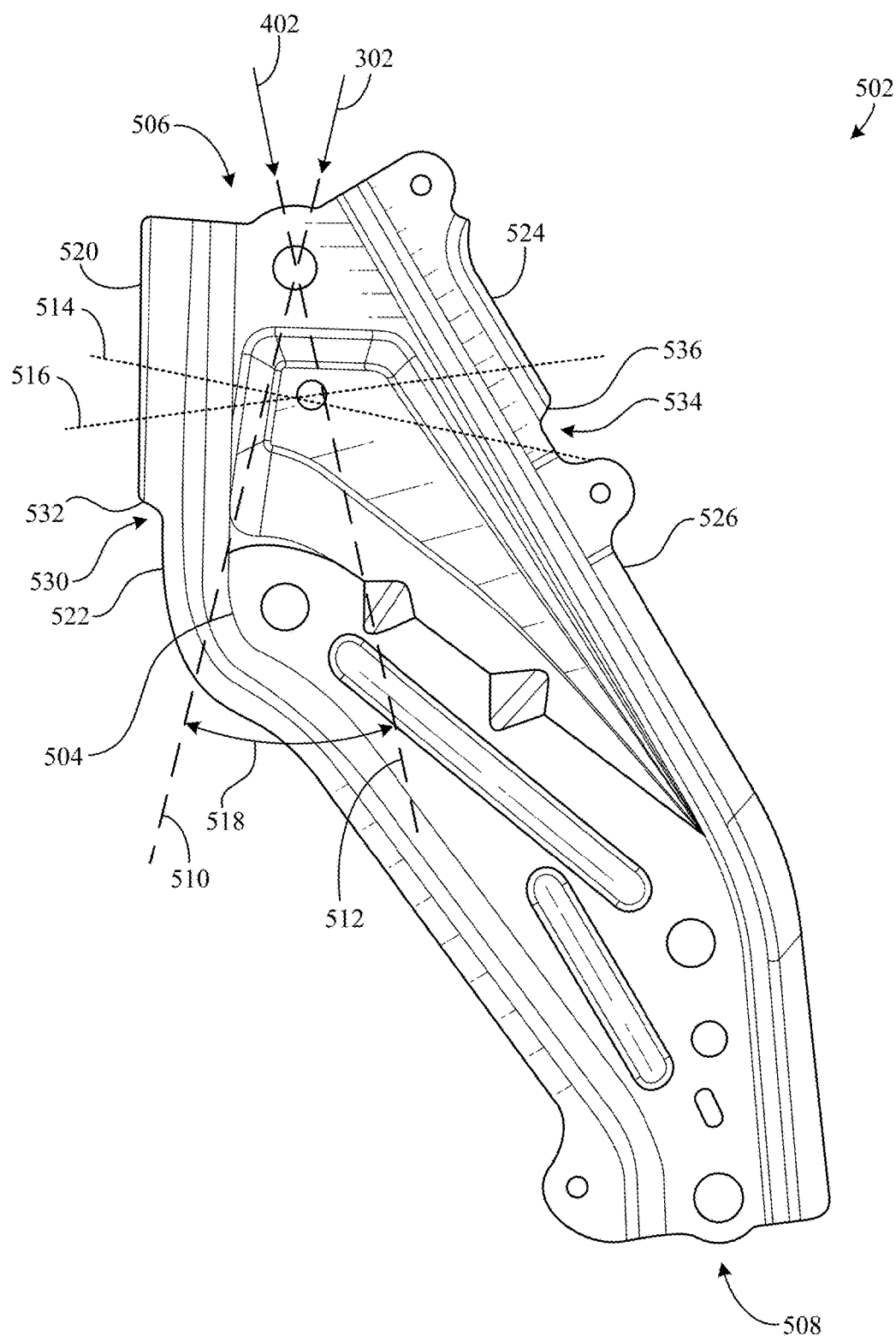
FIG. 5 is a view of an example brace in accordance with the teachings of this disclosure.

FIG. 5 is a view of a third example brace (e.g., a subframe brace) 502 in accordance with the teachings of this disclosure. In some examples, the third brace 502 of FIG. corresponds to any one of the braces 106, 202, 204 shown in FIGS. 1-4 (e.g., including the primary brace) and/or can be used to implement any one of the braces 106, 202, 204 shown in FIGS. 1-4. Thus, aspects described in connection with the third brace 502 can likewise apply to any one or more (e.g., all) of the braces 106, 202, 204 shown in FIGS. 1-4. In the example of FIG. 5, a third body 504 (i.e., a third brace body) of the third brace 502 includes a fifth terminal portion 506 (e.g., a first end of the third brace body 504) 510, and a sixth terminal portion (e.g., a second end of the third brace body 504) 508 opposite relative to the fifth terminal portion 506. In some examples, the third brace body 504 of FIG. 5 can be configured to attach the subframe 102 to the body structure 104, for example, via coupling the fifth terminal portion 506 to the subframe 102 and coupling the sixth terminal portion 508 to the vehicle body structure 104.

In some examples, to provide the third brace 502 with the two target deformation modes, the third brace body 504 is shaped to have a first stiffness along a fourth axis 510 corresponding to a direction of the first load 302. When the fifth terminal portion 506 receives the first load 302 during the first vehicle impact event, the first load 302 is substantially aligned to and/or directed along the fourth axis 510, as shown in FIG. 5. The fourth axis 510 of FIG. 5 extends through the third brace body 504. Further, in such examples, the third brace body 504 is shaped to have a second stiffness along a fifth axis 512, different from the fourth axis 510, corresponding to a direction of the second load 402. When the fifth terminal portion 506 of the third brace body 504 receives the second load 402 during the second vehicle impact event, the second load 402 is substantially aligned to and/or directed along the fifth axis 512, as shown in FIG. 5. The fifth axis 512 of FIG. 5 extends through the third brace body 504. In particular, the second stiffness is substantially greater than the first stiffness, which facilitates tearing the third brace body 504 and/or separating the third brace 502 from the subframe 102 only during the second vehicle impact event. In other words, the third brace 502 or the body 504 thereof is configured to be substantially stiffer along the fifth axis 512 compared to the fourth axis 510. For example, a value of the second stiffness is at least 10% greater than a value of the first stiffness.

According to the illustrated example of FIG. 5, the third body 504 of the third brace 502 is asymmetric. That is, in some examples, the third brace body 504 of FIG. 5 is not associated with or does not have a line of symmetry.

In some examples, when the first load 302 is greater than or equal to the first threshold load previously described, the third brace body 504 is configured to deform (e.g., bend, fold, etc.) at or along a first body line 514 that is substantially perpendicular to the fourth axis 510, which is discussed in greater detail below in connection with FIGS. 8A, 8B, and 8C. Accordingly, in such examples, the third brace 502 or the third brace body 504 is configured to have (a) a first target deformation mode in which the third brace body 504 deforms along the first body line 514. Such a deformation mode can be activated to reduce the amount of cabin intrusion associated with the vehicle 100 when the first load 302 applied to the fifth terminal portion 506 by the subframe 102 exceeds the first threshold load, as previously described.

On the other hand, in some examples, when the second load 402 of FIG. 5 is greater than or equal to a second threshold load, the third brace body 504 is configured to deform (e.g., bend, fold, etc.) at or along a second body line 516 that is substantially perpendicular to the fifth axis 512, which is discussed in greater detail below in connection with FIGS. 9A, 9B, and 9C. The second body line 516 of FIG. 5 is different relative to the first body line 514. Accordingly, in such examples, the third brace 502 or the third brace body 504 is configured to have (b) a second target deformation mode, different from the first target deformation mode, in which the third brace body 504 deforms along the second body line 516. Such a deformation mode can be activated to reduce the deceleration pulse input to the occupant of the vehicle 100 when the second load 402 applied to the fifth terminal portion 506 by the subframe 102 exceeds the second threshold load, as previously described.

In some examples, the fourth axis 510 and the fifth axis 512 define a first angle 518 that is, for example, between 15 degrees and 45 degrees. Accordingly, in such examples, the fourth axis 510 and the fifth axis 512 are angled relative to each other. Further, as previously described, the first body line 514 is substantially perpendicular to the fourth axis 510, and the second body line 516 is substantially perpendicular to the fifth axis 512. That is, in some examples, the first body line 514 of FIG. 5 and the fourth axis 510 define an angle that is 90 degrees or within +/−10% of 90 degrees. Further, in some examples, the second body line 516 and the fifth axis 512 define an angle that is 90 degrees or within +/−10% of 90 degrees.

To facilitate defining a directional stiffness of the third body 504, the third brace 502 of FIG. 5 can be provided with one or more structural features positioned on the third brace body 504. In some examples, the third brace 502 includes a first flange (e.g., a stiffening flange) 520 arranged along the third body 504. In such examples, the first flange 520 is coupled to a first side 522 of the third brace body 504 and positioned adjacent the fifth terminal portion 506. Additionally or alternatively, in some examples, the third brace 502 includes a second flange (e.g., a stiffening flange) 524 arranged along the third body 504. In such examples, the second flange 524 is coupled to a second side 526 of the third brace body 504, opposite to the first side 522, and positioned adjacent the fifth terminal portion 506. As shown in FIG. 5, the first and second flanges 520, 524 extend along the third brace body 504 away from the fifth terminal portion 506 thereof.

Additionally or alternatively, the third brace 502 of FIG. 5 can be provided with one or more different structural features positioned on the third brace body 504. In some examples, the third brace 502 includes a first notch (e.g., a stress relief notch) 530 positioned on third brace body 504. The first notch 530 of FIG. 5 extends at least partially or entirely through the third brace body 504. In such examples, the first notch 530 is formed and/or defined by a first end 532 of the first flange 520 and the first side 522 of the third brace body 504. Additionally or alternatively, in some examples, the third brace 502 includes a second notch (e.g., a stress relief notch) 534 positioned on the third brace body 504. The second notch 534 of FIG. 5 extends at least partially or entirely through the third brace body 504. In such examples, the second notch 534 is formed and/or defined by an end 536 of the second flange 524 and the second side 524 of the third brace body 504. In other words, the third brace 502 of FIG. 5 can include at least one stress relief notch 530, 534 formed by (a) the end 532 of the first flange 520 and the first side 522 of the third brace body 504 or (b) the end 536 of the second flange 524 and the second side 526 of the third brace body 504.

Additionally, in some examples, one or more (e.g., all) of the structural feature(s) 520, 524, 530, 534 shown in FIG. 5 can be sized, shaped, structured, and/or otherwise configured to advantageously concentrate stress in one or more target areas of the third brace body 504, thereby urging the third brace body 504 to substantially deform in the target area(s) when loaded, as discussed further below.

Although the two flanges 520, 524 are illustrated in FIG. 5, in some examples, the third brace 502 is implemented differently. For example, the third brace 502 can include a single flange 520, 524 or one or more other flanges in addition or alternatively to the first flange 520 shown in FIG. 5 and/or the second flange 524 shown in FIG. 5. Further, although the two notches 530, 534 are illustrated in FIG. 5, in some examples, the third brace 502 is implemented differently. For example, the third brace 502 can include a single notch 530, 534 or one or more other notches in addition or alternatively to the first notch 530 shown in FIG. 5 and/or the second notch 534 shown in FIG. 5.

Figure 6:
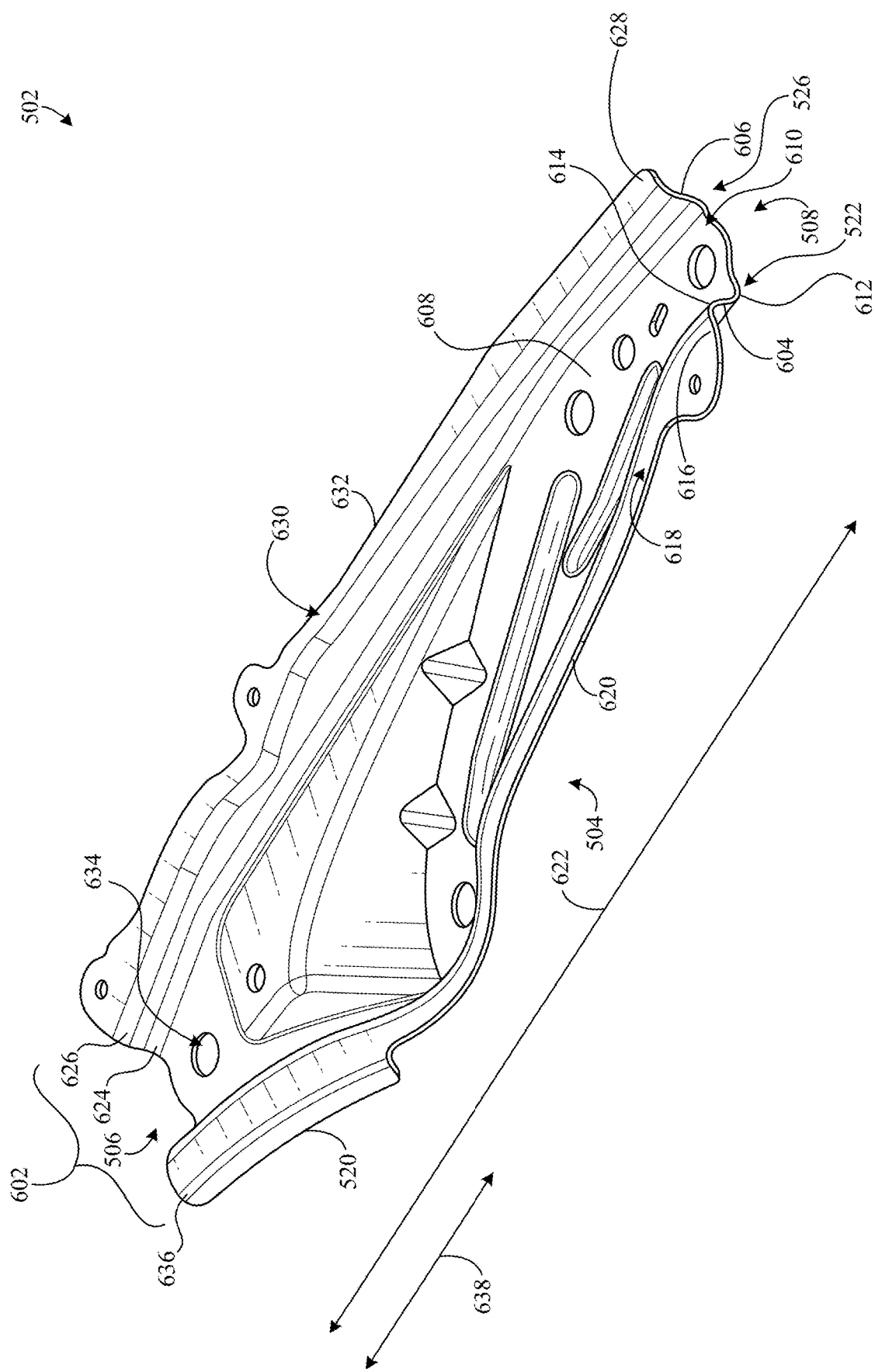
FIGS. 6 and 7 are other views of the example brace of FIG. 5 and show example structural features thereof.

FIG. 6 is another view of the third example brace 502 and shows the first flange 520. In some examples, the third brace body 504 includes a plate 602, for example, produced via one or more manufacturing processes or techniques. In such examples, the plate 602 is defined by a first wall portion 604, a second wall portion 606, and an intermediate or base portion 608 connected between the first and second wall portions 604, 606. In other words, the brace body 504 can include the first wall portion 604, the second wall portion 606, and the base portion 608. As shown in FIG. 6, each of the first and second wall portions 604, 606 curves and/or extends away from a surface (e.g., a substantially flat or planar surface) of the base portion 608 to define a recess 610 in the third brace body 504. For example, the recess 610 can be a space between the first and second wall portions 604, 606. As shown in FIG. 6, the recess 610 extends across the third brace body 504 between the fifth and sixth terminal portions 506, 508, for example, from the fifth terminal portion 506 to the sixth terminal portion 508.

In some examples, the third brace body 504 includes a first preformed curvature or bend (e.g., a bend produced via a manufacturing process) 612 positioned on the first wall portion 604 and the base portion 608. Additionally or alternatively, in some examples, the third brace body 504 includes a second preformed curvature or bend 614 positioned on only the first wall portion 604. In particular, in such examples, the first wall portion 604 of FIG. 6 curves and/or extends away from the second wall portion 606 to define a first edge 616 of the third brace body 504. The first edge 616 includes, for example, a relatively narrow area 618 adjacent a border 620 of the first wall portion 604. As shown in FIG. 6, the first edge 616 extends across at least part of a length 622 of the third brace body 504, for example, from the fifth terminal portion 506 to the sixth terminal portion 508.

Additionally or alternatively, in some examples, the third brace body 504 includes a third preformed curvature or bend 624 positioned on the second wall portion 606 and the base portion 608. Further, in some examples, the third brace body 504 includes a fourth preformed curvature or bend 626 positioned on only the second wall portion 606. In particular, in such examples, the second wall portion 606 of FIG. 6 curves and/or extends away from the first wall portion 604 to define a second edge 628 of the third brace body 504. The second edge 628 includes, for example, a relatively narrow area 630 adjacent a border 632 of the second wall portion 606. As shown in FIG. 6, the second edge 628 extends across at least part of the length 622 of the third brace body 504, for example, from the fifth terminal portion 506 to the sixth terminal portion 508.

In some examples, any one or more (e.g., all) of the first preformed bend 612, the second preformed bend 614, the first edge 616, and/or, more generally, the first wall portion 604 of FIG. 6 correspond to the first side 522 of the third brace body 504 and/or can be used to implement the first side 522. Additionally or alternatively, in some examples, any one or more (e.g., all) of the third preformed bend 624, the fourth preformed bend 626, the second edge 628, and/or, more generally, the second wall portion 606 of FIG. 6 correspond to the second side 526 of the third brace body 504 and/or can be used to implement the second side 526.

Additionally, in some examples, the third brace 502 includes one or more apertures (e.g., circular holes) positioned on the third brace body 504, which facilitate coupling the third brace body 504 to (a) the subframe 102 and/or (b) the body structure 104 via one or more fasteners. In particular, the third brace 502 of FIG. 6 includes a primary aperture 634 positioned on the base portion 608 at or adjacent the fifth terminal portion 506. The primary aperture 634 of FIG. 6 extends at least partially or entirely through the base portion 608. In particular, the primary aperture 634 is configured to receive a fastener for coupling the third brace body 504 to the subframe 102. In some examples, the primary aperture 634 serves as an attachment point of the third brace 502 and/or is sometimes referred to as an attachment point.

In the example of FIG. 6, the first flange 520 is coupled to the first edge 616 of the first wall portion 604. In some examples, the third brace body 504 includes a fifth preformed curvature or bend 636 positioned on the first flange 520 and the first edge 616. As shown in FIG. 6, the first flange 520 extends and/or curves away from the first edge 616. Further, in some examples, each of the first and second flanges 520, 524 has a length that is less than the length 622 of the third brace body 504. As shown in FIG. 6, a length 638 the first flange 520 is less than the length 622 of the third brace body 504.

In some examples, the third brace 502 is one-piece component, for example, such that at least two or more (e.g., all) of the first flange 520, the second flange 524, the first wall portion 604, the second wall portion 606, and/or the base portion 608 are integral. In any case, any or all of the first flange 520, the second flange 524, the first wall portion 604, the second wall portion 606, the base portion 608, and/or, more generally, the third brace body 504 can be constructed of one or more materials having suitable properties (e.g., a relatively high strength and/or rigidity) such as, for example, one or more metals (e.g., steel, carbon steel, iron, aluminum, etc.), one or more composites, etc., any other material(s) suitable for use with vehicles, or a combination thereof.

Figure 7:
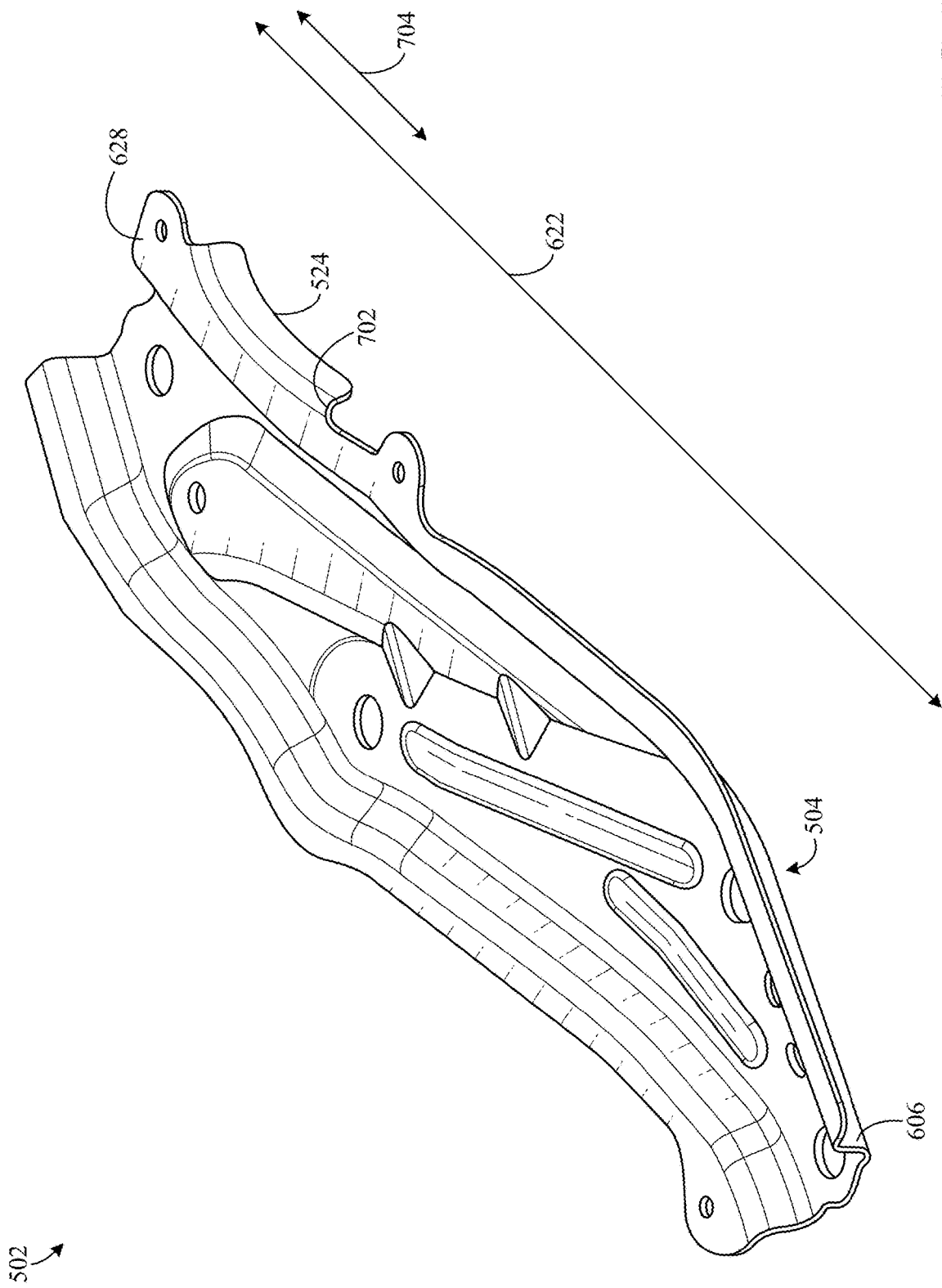

FIG. 7 is another view of the third example brace 502 and shows the second flange 524. In the example of FIG. 7, the second flange 524 is coupled to the second edge 628 of the second wall portion 606. In some examples, the third brace body 504 includes a sixth preformed curvature or bend 702 positioned on the second flange 524 and the second edge 628. As shown in FIG. 7, the second flange 524 extends and/or curves away from the second edge 628. Further, as shown in FIG. 7, a length 704 the second flange 524 is less than the length 622 of the third brace body 504.

Figure 8A:
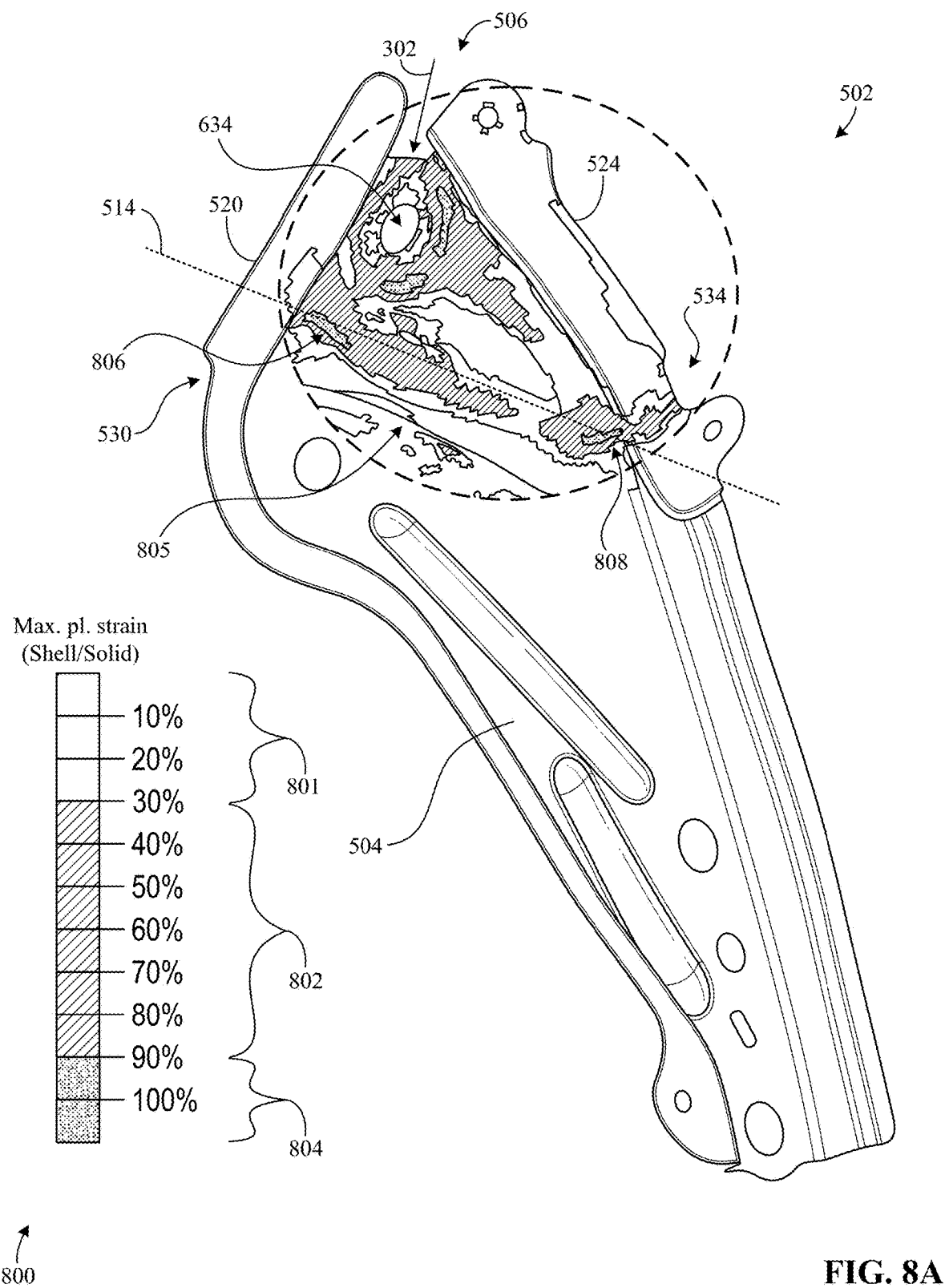
FIGS. 8A, 8B, and 8C illustrate example deformation characteristics associated with the example brace of FIG. 5 provided by activating a first target deformation mode thereof.
Figure 8B:
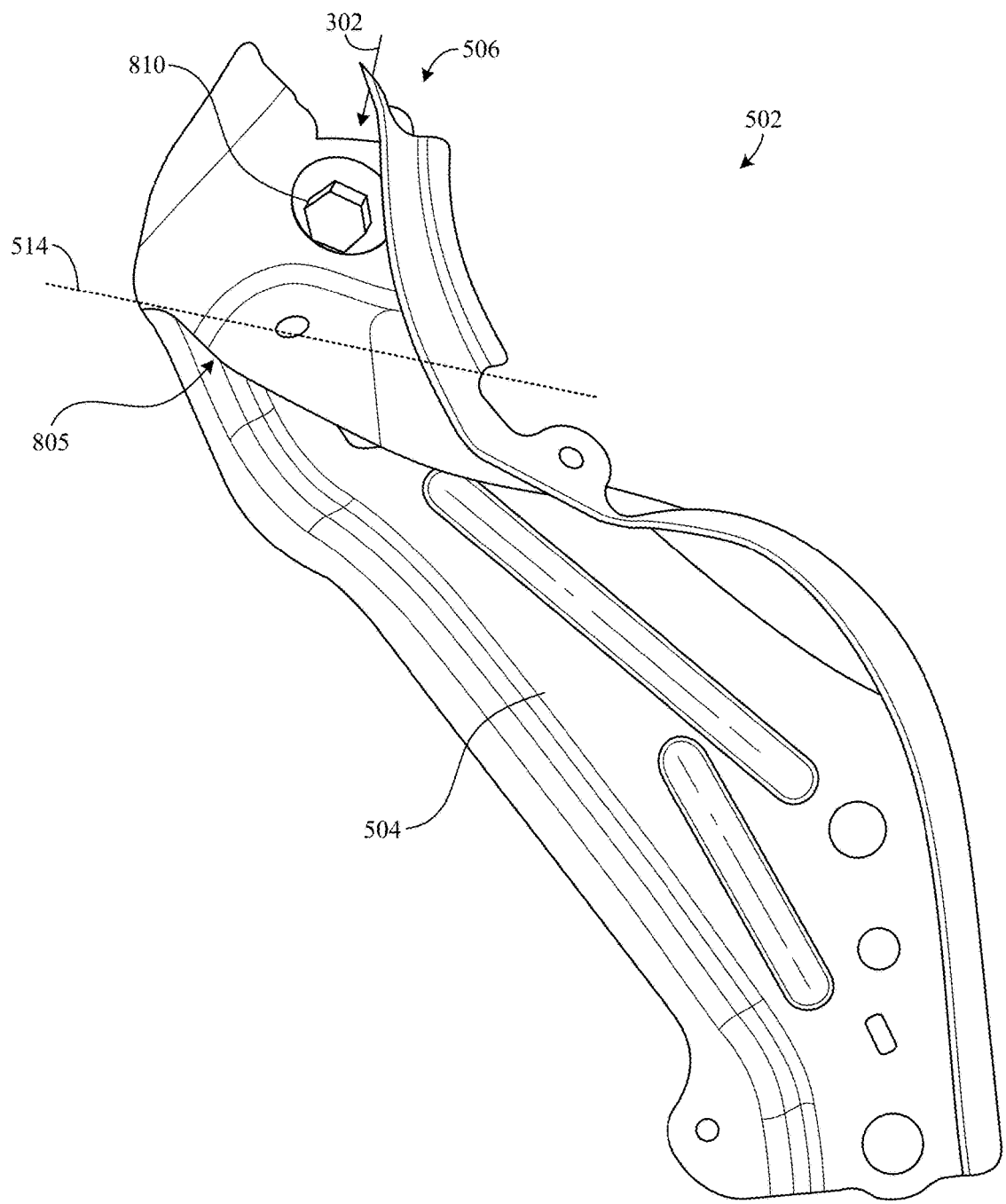
Figure 8C:
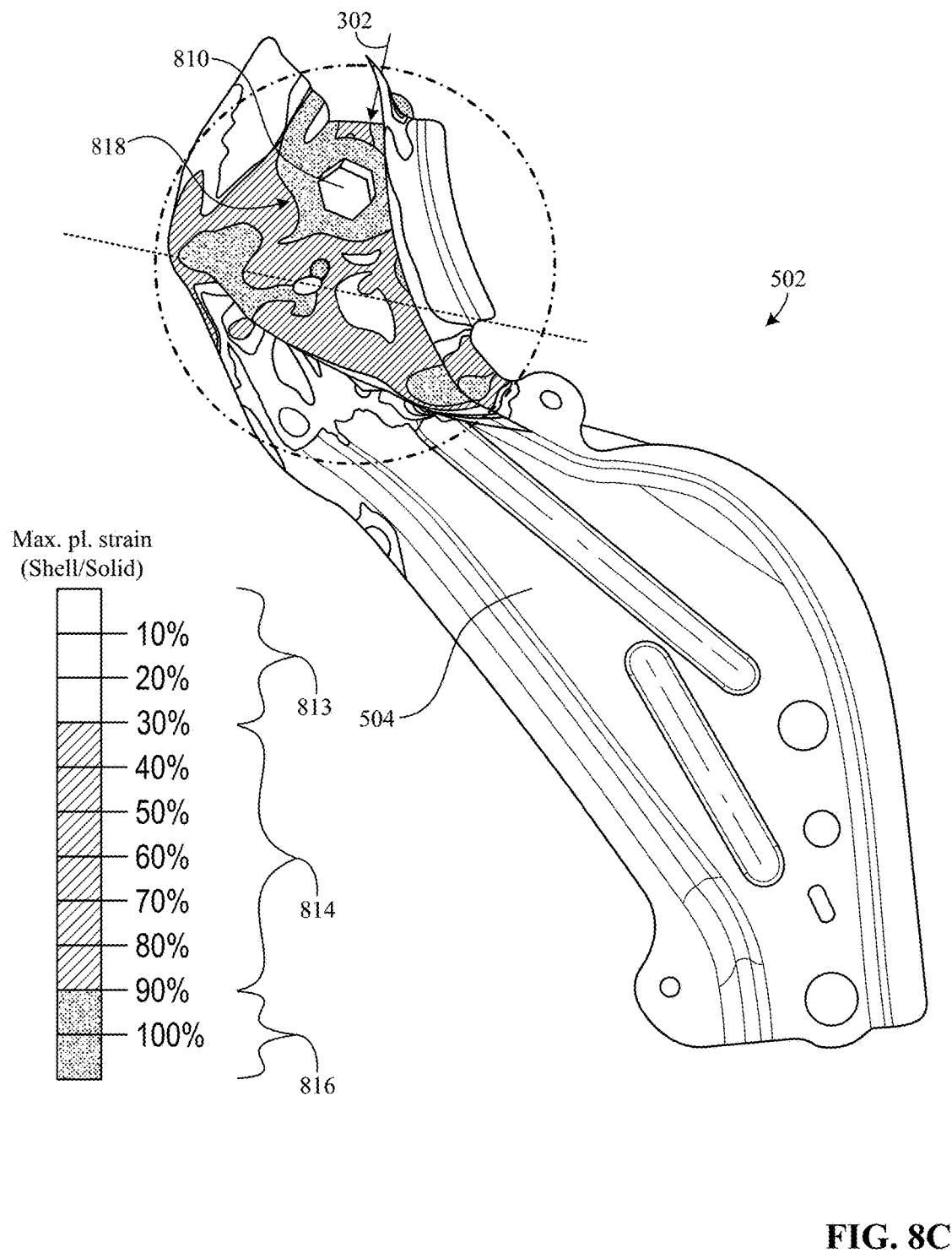

FIGS. 8A, 8B, and 8C illustrate example deformation characteristics associated with the third brace 502 provided by activating the first target deformation mode. Turning in detail to FIG. 8A, a first strain legend or scale 800 shows strain associated with the third brace 502 resulting from, for example, performing a first ODB crash test on the vehicle 100. According to the illustrated example of FIG. 8A, the third brace body 504 has low strain areas 801, medium strain areas 802 (as represented by the cross-hatching of FIG. 8A), and high strain areas 804 (as represented by the dotted shading of FIG. 8A) associated therewith. Each of the strain areas 801, 802, 804 of FIG. 8A is represented as percentage of a strain capacity of the third brace body 504. Further, in the example of FIG. 8A, strain is less than or under a maximum elongation of the third brace body 504 or a material thereof. Stated differently, the strain illustrated in FIG. 8A is under a material rupture strain of the third brace body 504. As a result, tearing does not occur in the third brace body 504.

In the illustrated example of FIG. 8A, the first load 302 is applied to the fifth terminal portion 506 of the third brace body 504. For example, as previously described, the subframe 102 can apply such a load to the third brace 502 or the body 504 thereof during the first vehicle impact event. In particular, the first load 302, when greater than or equal to the first threshold load, causes the third brace body 504 to begin to substantially deform (e.g., bend, fold, etc.) at or along the first body line 514. In other words, such a load triggers or activates the first deformation mode, for example, to reduce an amount of cabin intrusion associated with the vehicle 100 during the first vehicle impact event.

In some examples, one or more (e.g., all) of the structural feature(s) 520, 524, 530, 534 of the third brace 502 cause the third brace body 504 to form a first or primary bend 805 thereon in response to the subframe 102 applying the first load 302 to the third brace 502. In such examples, the first flange 520 and/or the first notch 530 is/are configured to concentrate stress from the first load 302 in a first target area 806 of the third brace body 504, which facilitates deformation of the third brace body 504 in the first target area 806. As such, the first target area 806 of FIG. 8A corresponds to the high strain areas 804 and can intersect with the first body line 514. Additionally or alternatively, in such examples, the second flange 524 and/or the second notch 534 is/are configured to concentrate stress from the first load 302 in a second target area 808 of the third brace body 504, which facilitates deformation of the third brace body 504 in the second target area 808. As such, the second target area 808 of FIG. 8A also corresponds to the high strain areas 804 and can intersect with the first body line 514. As shown in FIG. 8A, the first body line 514 is substantially aligned to the first target area 806 and the second target area 808. In particular, the primary bend 805 of FIG. 8A forms on the third brace body 504 as a result of such stress concentration provided by the structural feature(s) 520, 524, 530, 534. In some examples, the second target area 808 is at or adjacent the second notch 534.

As shown in FIG. 8A, the primary bend 805 extends across a central part of the third brace body 504 from the first target area 806 to the second target area 808. Further, in some examples, the primary bend 805 can extend past or beyond the first target area 806 and/or the second target area 808, for example, to the first flange 520 and/or the second notch 534. Further, the second target area 808 is spaced substantially further away from the primary aperture 634 (i.e., the attachment point of the third brace 502) relative to the first target area 806 to prevent the third brace 502 or the body 504 thereof from tearing during the first vehicle impact event. As such, the structural feature(s) 520, 524, 530, 534 can effectively divert a substantial portion of stress from the first load 302 away from the primary aperture 634 such that a third primary fastener 810 (shown in FIG. 8B) in the primary aperture 634 remains substantially connected to the third brace body 504 and the subframe 102.

Turning in detail to the illustrated example of FIG. 8B, the first load 302 or a portion thereof can be transferred from the subframe 102 to the third brace body 504 via the third primary fastener 810 positioned in the primary aperture 634. For example, the third primary fastener 810 can be configured to couple the fifth terminal portion 506 of the third brace body 504 to a side portion 218, 222 of the subframe 102. As such, the third primary fastener 810 can contact an inner surface (e.g., an inner circumferential surface) of the third brace body 504 defining the primary aperture 634. According to the illustrated example of FIG. 8B, the first load 302 activates the first deformation mode to reduce an amount of cabin intrusion associated with the vehicle 100 (e.g., during a second ODB crash test performed on the vehicle 100), similar to the illustrated example of FIG. 8A. As a result, the primary bend 805 forms on the third brace body 504 at or along the first body line 514.

Turning in detail to the illustrated example of FIG. 8C, a second strain legend or scale 812 shows strain associated with the third brace 502 resulting from, for example, performing the second ODB crash test on the vehicle 100. That is, FIGS. 8B and 8C show the same deformation characteristics associated with the third brace body 504. In the illustrated example of FIG. 8C, the third brace body 504 has low strain areas 813, medium strain areas 814 (as represented by the cross-hatching of FIG. 8C), and high strain areas 816 (as represented by the dotted shading of FIG. 8C) associated therewith, similar to the illustrated example of FIG. 8A.

According to the illustrated example of FIG. 8C, strain of the third brace body 504 is distributed evenly around the third primary fastener 810, which prevents an area of the third brace body 504 adjacent the third primary fastener 810 from tearing. Accordingly, to prevent tearing, one or more (e.g., all) of the structural feature(s) 520, 524, 530, 534 can be configured to concentrate stress from the first load 302 in a third target area 818 of the third brace body 504 that surrounds the primary aperture 634 and/or surrounds the third primary fastener 810.

Figure 9A:
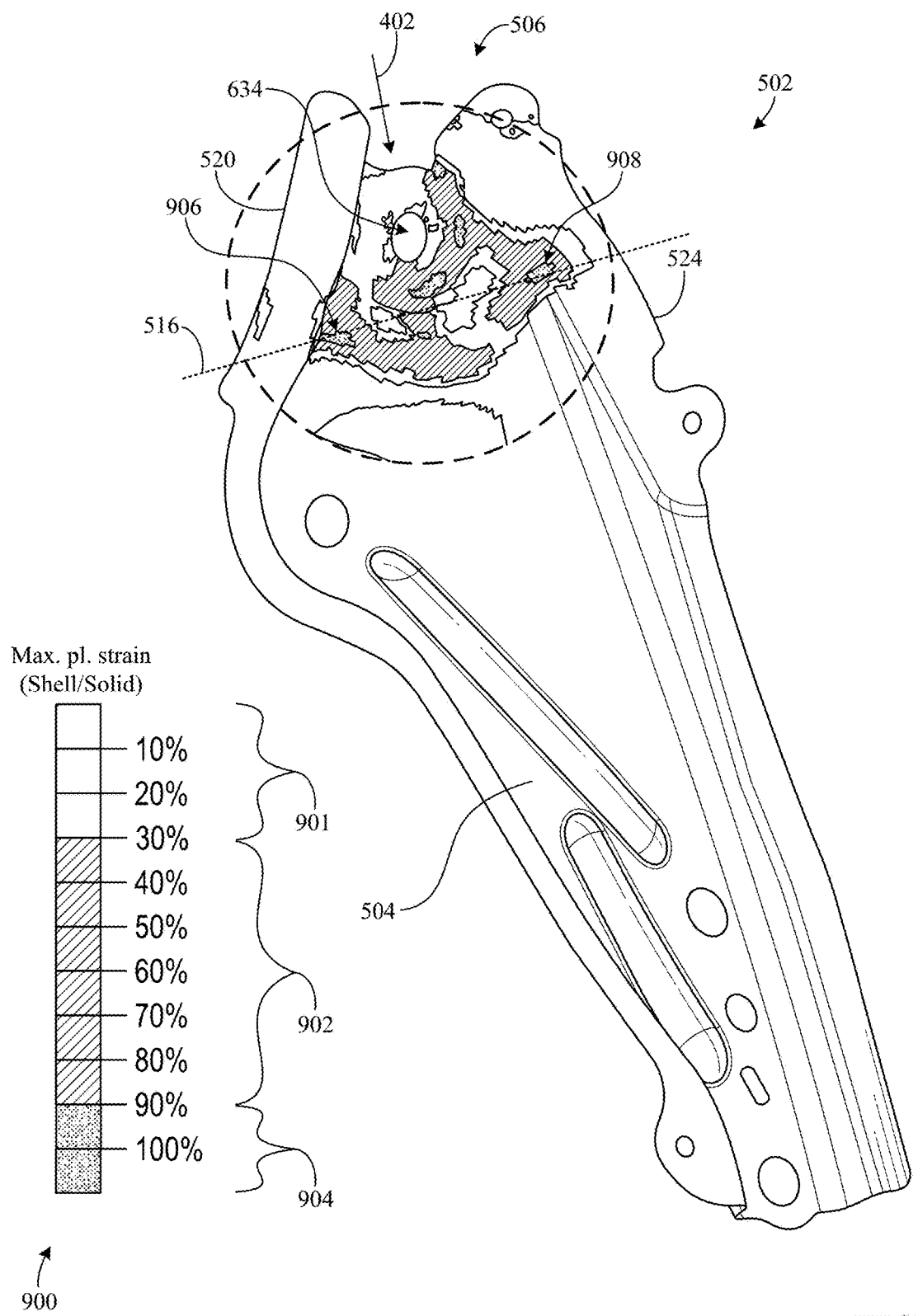
FIGS. 9A, 9B, 9C illustrate example deformation characteristics associated with the example brace of FIG. 5 provided by activating a second target deformation mode thereof.
Figure 9B:
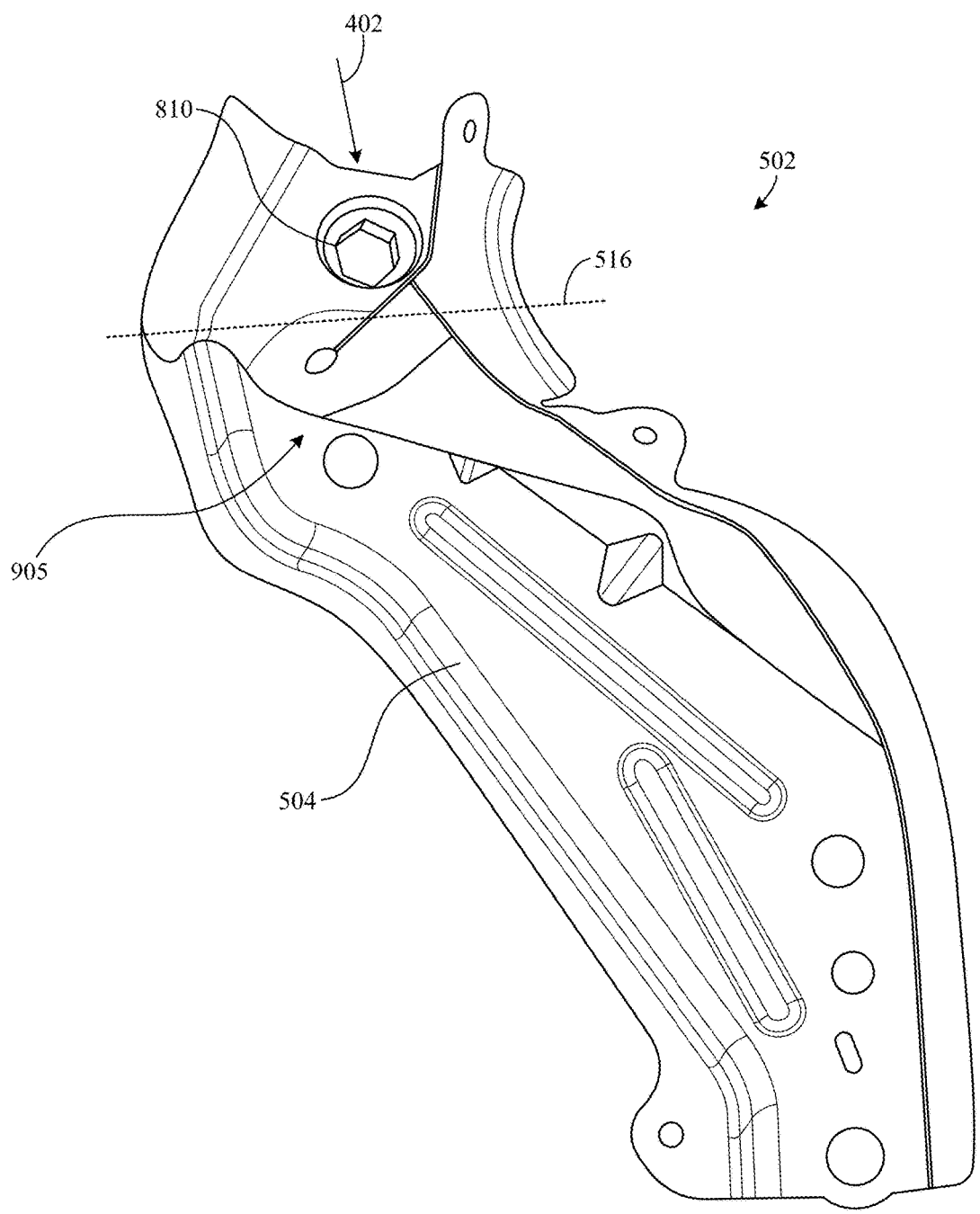
Figure 9C:
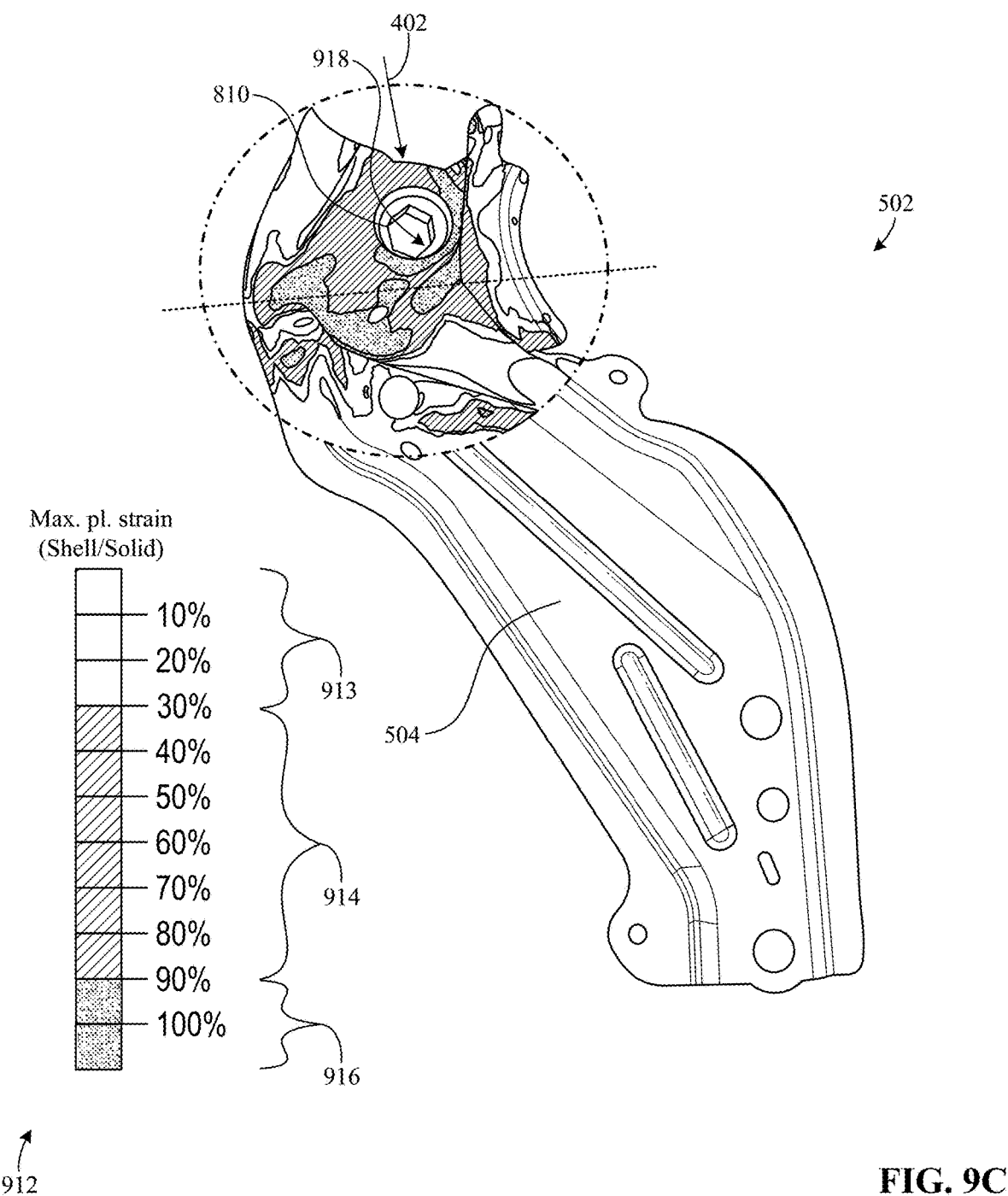

FIGS. 9A, 9B, and 9C illustrate example deformation characteristics associated with the third brace 502 provided by activating the second target deformation mode. Turning in detail to FIG. 9A, a third strain legend or scale 900 shows strain associated with the third brace 502 resulting from, for example, performing a first full FRB crash test on the vehicle 100. According to the illustrated example of FIG. 9A, the third brace body 504 has low strain areas 901, medium strain areas 902 (as represented by the cross-hatching of FIG. 9A), and high strain areas 904 (as represented by the dotted shading of FIG. 9A) associated therewith. Each of the strain areas 901, 902, 904 of FIG. 9A is represented as percentage of a strain capacity of the third brace body 504. Further, in the example of FIG. 9A, at least some strain is greater than or over the maximum elongation of the third brace body 504 or the material thereof. Stated differently, at least some of the strain illustrated in FIG. 9A is over the material rupture strain of the third brace body 504. As a result, tearing can occur in the third brace body 504, for example, adjacent and/or proximate to the primary aperture 634.

In the illustrated example of FIG. 9A, the second load 402 is applied to the fifth terminal portion 506 of the third brace body 504. For example, as previously described, the subframe 102 can apply such a load to the third brace 502 or the body 504 thereof during the second vehicle impact event. In particular, the second load 402, when greater than or equal to the second threshold load, causes the third brace body 504 to begin to substantially deform (e.g., bend, fold, etc.) at or along the second body line 516. In other words, such a load triggers or activates the second deformation mode, for example, to reduce a deceleration pulse input to an occupant of the vehicle 100 during the second vehicle impact event.

In some examples, one or more (e.g., all) of the structural feature(s) 520, 524, 530, 534 of the third brace 502 cause the third brace body 504 to form a second or auxiliary bend 905 (better shown in FIG. 9B) thereon in response to the subframe 102 applying the second load 402 to the third brace 502. In such examples, the first flange 520 is configured to concentrate stress from the second load 402 in a fourth target area 906 of the third brace body 504, which facilitates deformation of the third brace body 504 in the fourth target area 906. As such, the fourth target area 906 of FIG. 9A corresponds to the high strain areas 904 and can intersect with the second body line 516. Additionally or alternatively, in such examples, the second flange 524 is configured to concentrate stress from the second load 402 in a fifth target area 908 of the third brace body 504, which facilitates deformation of the third brace body 504 in the fifth target area 908. As such, the fifth target area 908 of FIG. 9A also corresponds to the high strain areas 904 and can intersect with the second body line 516. As shown in FIG. 9A, the second body line 516 is substantially aligned to the fourth target area 906 and the fifth target area 908. In particular, the auxiliary bend 905 of FIG. 9A forms on the third brace body 504 as a result of such stress concentration provided by the structural feature(s) 520, 524.

The auxiliary bend 905, when formed, can extend across the third brace body 504, adjacent the fifth terminal portion 506, from the fourth target area 906 to the fifth target area 908. Further, in some examples, the auxiliary bend 905 can extend past or beyond the fourth target area 906 and/or the fifth target area 908, for example, to the first flange 520 and/or the second flange 524.

In contrast to the illustrated example of FIG. 8A, each of the fourth and fifth target areas 906, 908 of FIG. 9A is spaced from the primary aperture 634 by substantially the same distance (e.g., a relatively short distance) to urge the third brace 502 or the body 504 thereof to tear during the second vehicle impact event. That is, the primary aperture 634 of FIG. 9A is substantially equidistant from the fourth and fifth target areas 906, 908. Accordingly, at least some of the structural feature(s) 520, 524 can effectively trap a substantial amount of the stress proximate to the primary aperture 634 such that the third primary fastener 810 therein disconnects from the third brace body 504 during the second vehicle impact event.

Turning in detail to the illustrated example of FIG. 9B, the second load 402 or a portion thereof can be transferred from the subframe 102 to the third brace body 504 via the third primary fastener 810. According to the illustrated example of FIG. 9B, the second load 402 activates the second deformation mode to reduce a deceleration pulse input to the occupant of the vehicle 100 (e.g., during a second full FRB crash test performed on the vehicle 100), similar to the illustrated example of FIG. 9A. As a result, the auxiliary bend 905 forms on the third brace body 504 at or along the second body line 516.

Turning in detail to the illustrated example of FIG. 9C, a fourth strain legend or scale 912 shows strain associated with the third brace 502 resulting from, for example, performing the second full FRB crash test on the vehicle 100. That is, FIGS. 9B and 9C show the same deformation characteristics associated with the third brace body 504. In the illustrated example of FIG. 9C the third brace body 504 has low strain areas 913, medium strain areas 914 (as represented by the cross-hatching of FIG. 9C), and high strain areas 916 (as represented by the dotted shading of FIG. 9C) associated therewith, similar to the illustrated example of FIG. 9A.

According to the illustrated example of FIG. 9C, strain of the third brace body 504 is concentrated in a sixth target area (e.g., a corner or pocket) 918 of the third brace body 504 adjacent the third primary fastener 810, which initiates tearing. Unlike the third target area 818 shown in FIG. 8C, the sixth target area 918 of FIG. 9C extends around only part of the third primary fastener 810. That is, the sixth target area 918 does not surround the third primary fastener 810. In contrast to the illustrated example of FIG. 8C, strain is not distributed evenly around the third primary fastener 810. Accordingly, to initiate tearing, one or more (e.g., all) of the structural feature(s) 520, 524, 530, 534 can be configured to concentrate stress from the second load 402 in the sixth target area 918.

Figure 10A:
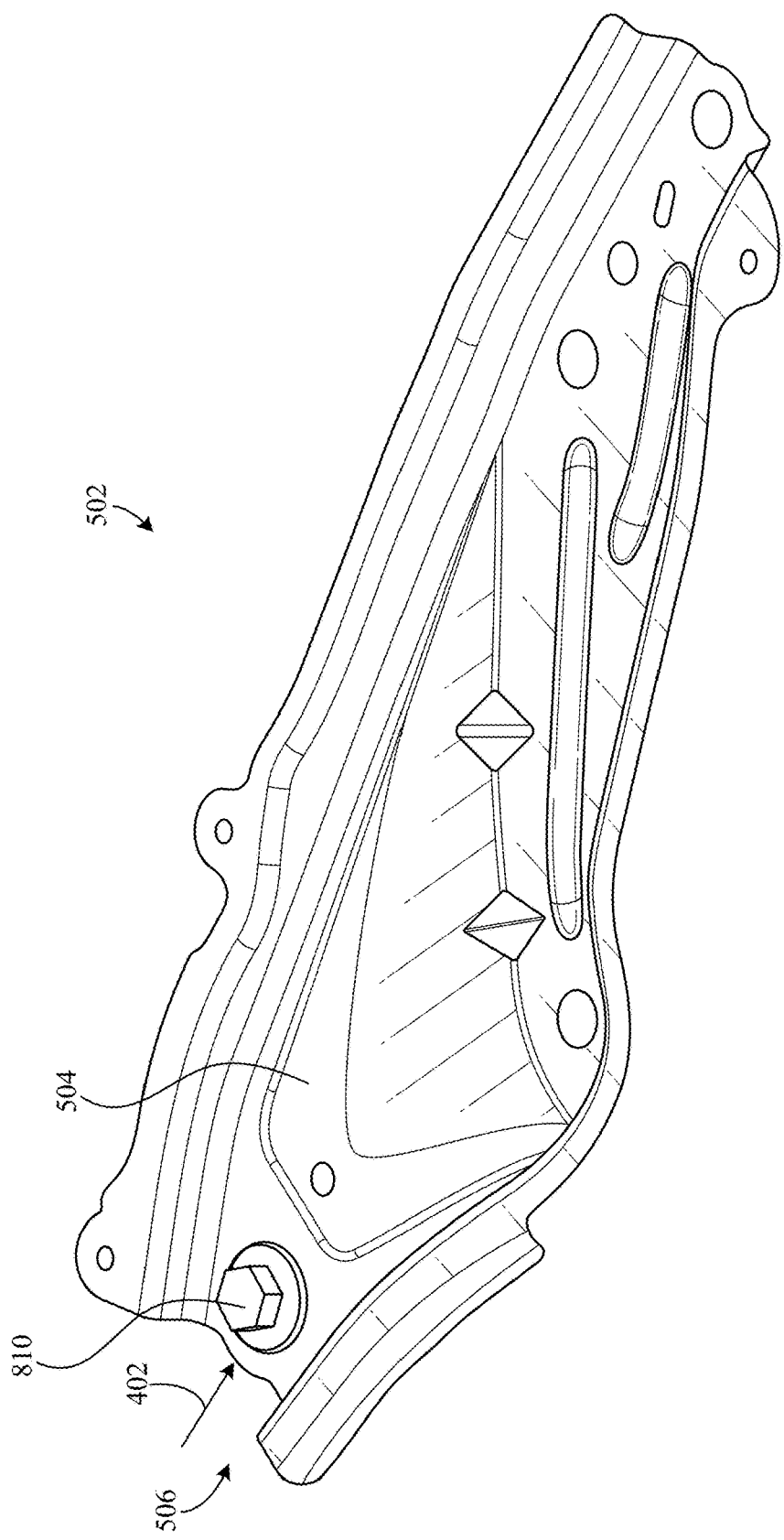
FIGS. 10A, 10B, 10C and 10D illustrate different example states of the example brace of FIG. 5 during a particular vehicle impact event.

FIGS. 10A, 10B, 10C and 10D illustrate different example states of the third brace 502 shown in FIG. 5 during the second vehicle impact event. According to the illustrated examples of FIGS. 10A, 10B, 10C and 10D, the third brace 502 receives the second load 402 at the fifth terminal portion 506 of the third brace body 504, which activates the second deformation mode of the third brace 502 or the body 504 thereof. For example, the third primary fastener 810 of FIGS. 10A, 10B, and 10C can transfer the second load 402 or a portion thereof from the subframe 102 to the third brace 502 during the second vehicle impact event. Turning in detail to FIG. 10A, an initial or first state of the third brace 502 is depicted, for example, immediately prior to the vehicle 100 colliding with the external structure.

Figure 10B:
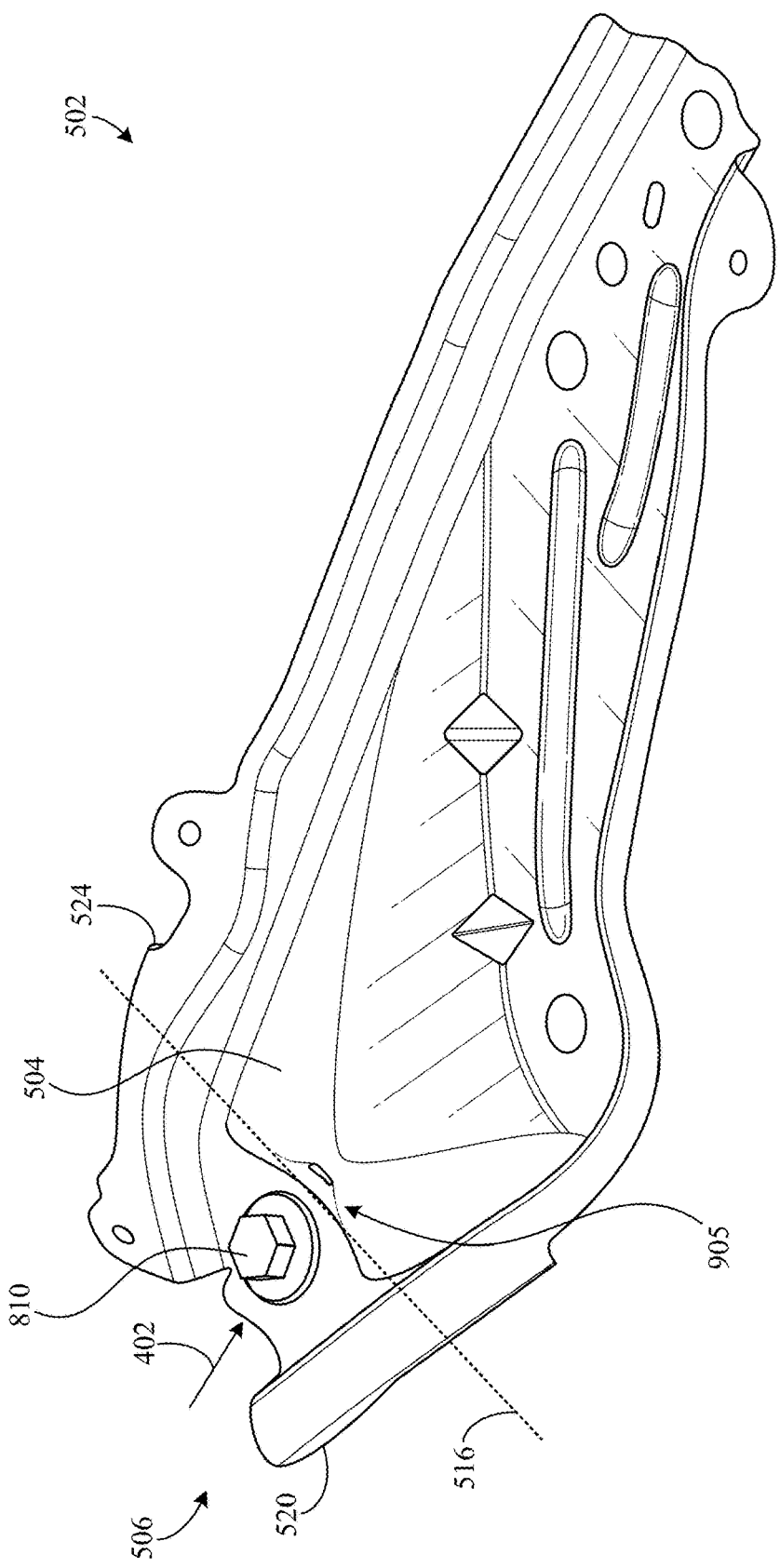

Turning in detail to FIG. 10B, a second state of the third brace 502 is depicted in which the third brace 502 or the body 504 thereof begins to bend and/or fold. For example, the auxiliary bend 905 begins to form on the third brace body 504 at or along the second body line 516, as previously described. In some examples, the first flange 520 and/or the second flange 524 can cause such deformation of the third brace body 504 to concentrate proximate to the third primary fastener 810.

Figure 10C:
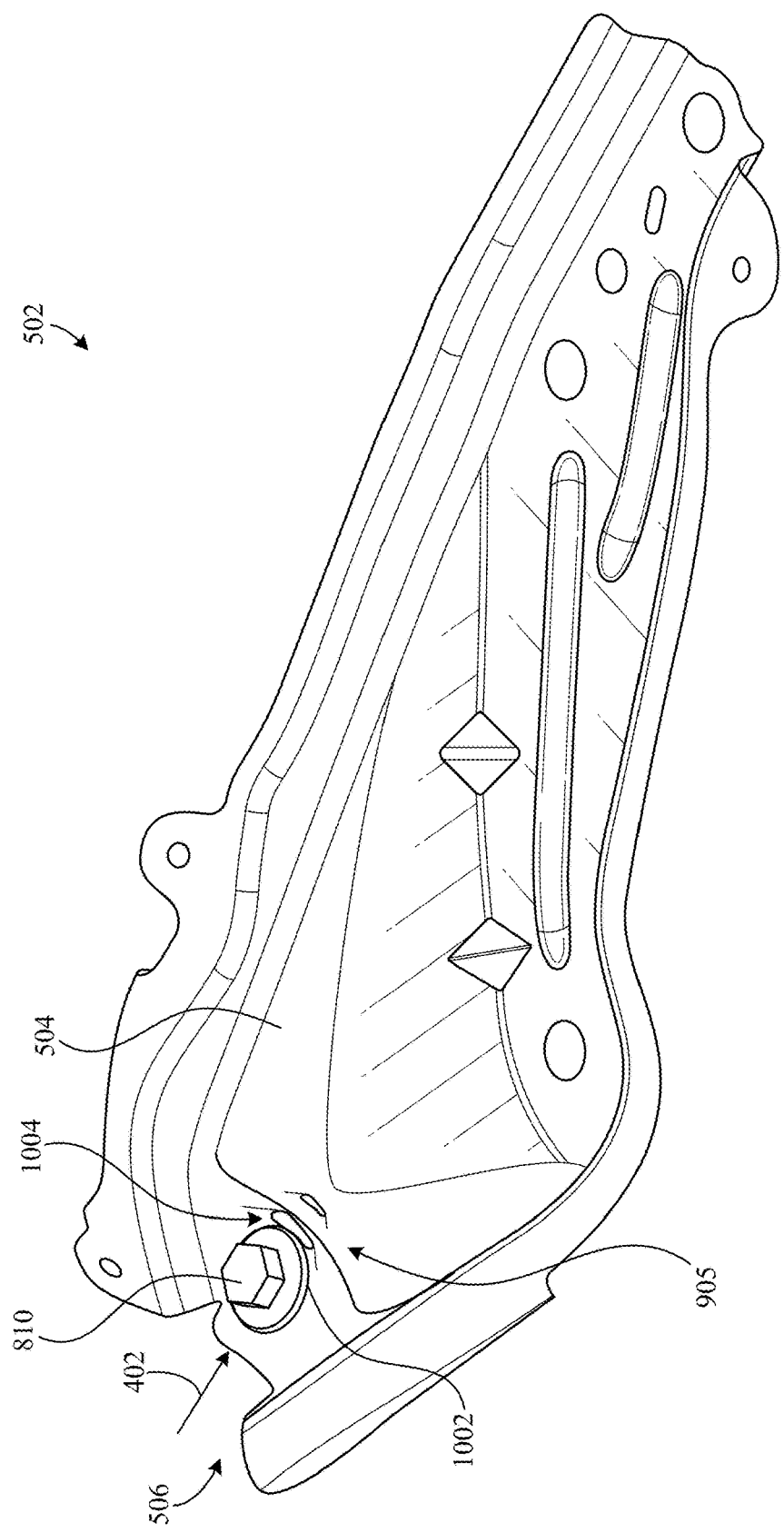

Turning in detail to FIG. 10C, a third state of the third brace 502 is depicted in which tearing is initiated in the third brace body 504 at or adjacent a head (e.g., a bolt head) 1002 of the third primary fastener 810. In particular, the auxiliary bend 905 of FIG. 10C can be relatively sharp. For example, a bend radius of the auxiliary bend 905 substantially decreases when the third brace 502 transitions from the second state to the third state. In some examples, when fully formed, the bend radius of auxiliary bend 905 is substantially less than a bend radius of the primary bend 805. Such a sharp bend formed on the third brace body 504 at or adjacent the third primary fastener 810 causes tearing. As shown in FIG. 10C, a third tear 1004 is formed on the third brace body 504 adjacent the head 1002 of the third primary fastener 810. For example, the subframe 102 can urge the third primary fastener 810 relative to the third brace body 504 such that the third primary fastener 810 tears the third brace body 504 in this manner.

Figure 10D:
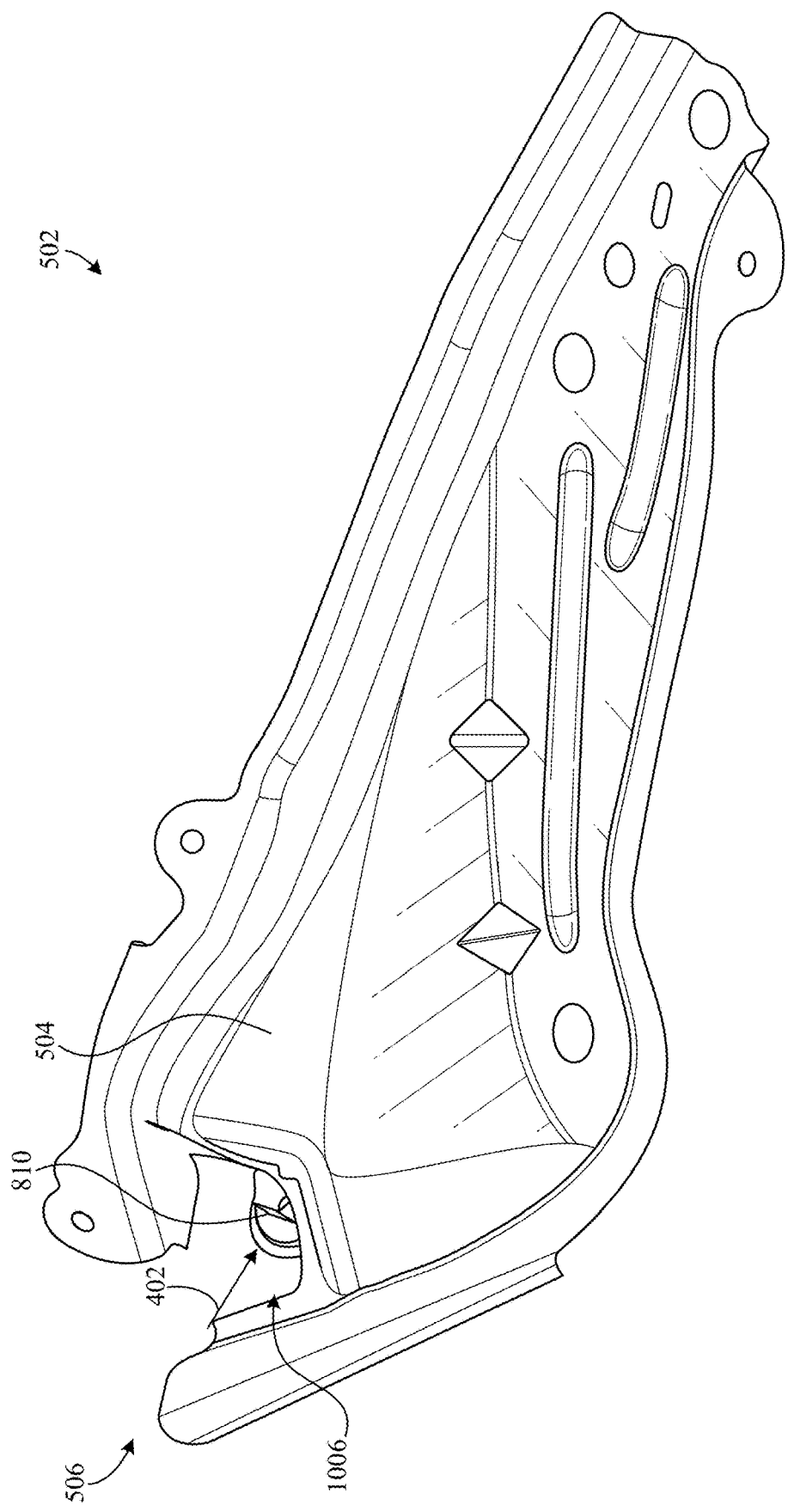

Turning in detail to FIG. 10D, a final or fourth state of the third brace 502 is depicted in which the third primary fastener 810 substantially separates from the third brace 502 or the body 504 thereof. As previously described, the third brace body 504 disconnects from the subframe 102 during the second vehicle impact event to break the primary load path of the vehicle 100 and reduce the deceleration pulse. In some examples, the subframe 102 urges the third primary fastener 810 to completely separate from the third brace 502 or the body 504 thereof. In such examples, the third tear 1004 propagates through the third brace body 504 to form an aperture 1006 in the third brace body 504, and the third primary fastener 810 can be pushed through the aperture 1006 and/or the third tear 1004.

Figure 11:
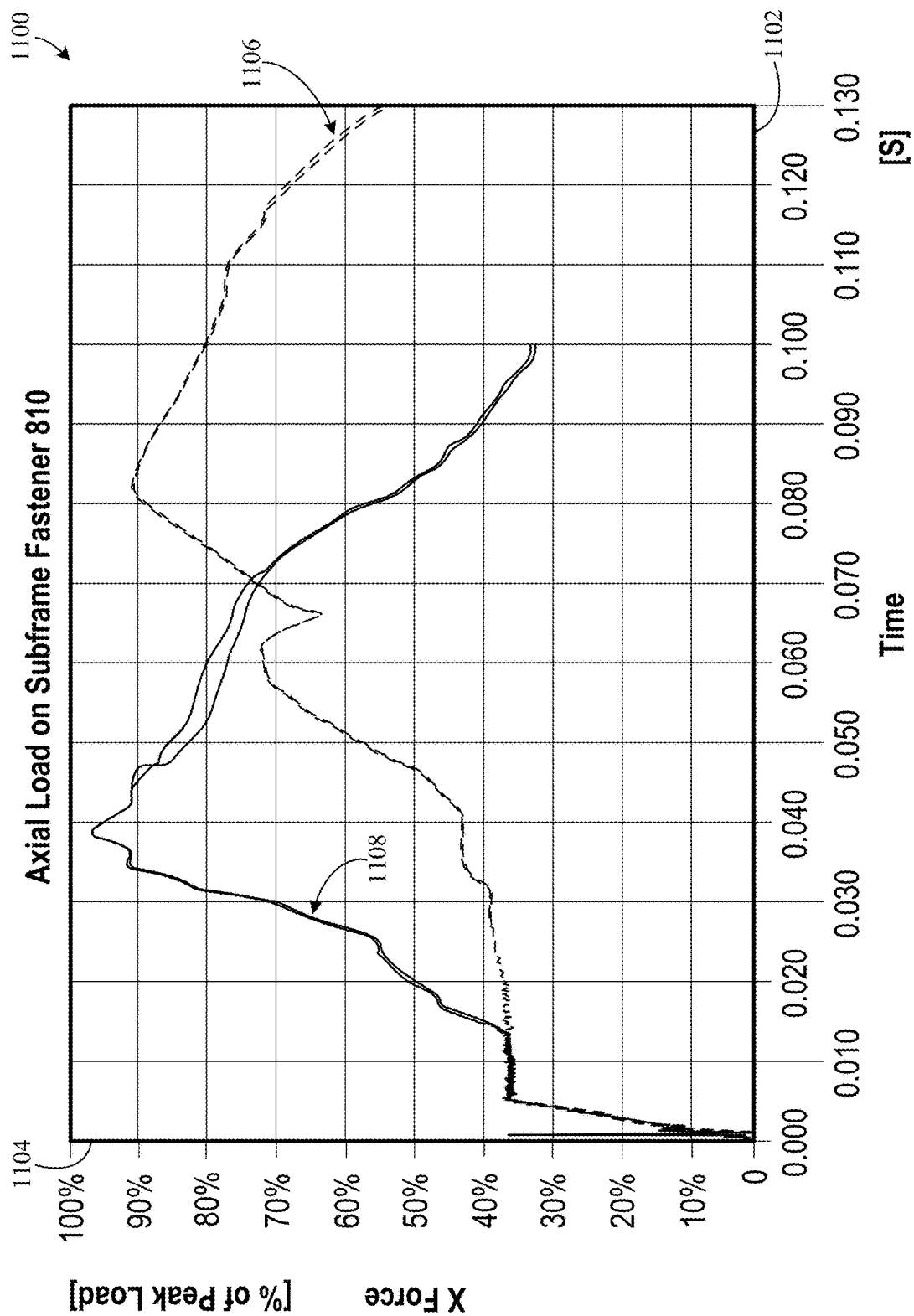
FIGS. 11-13 show graphs illustrating fastener loading characteristics associated with the example brace of FIG. 5 resulting from different vehicle impact events.

FIG. 11 shows a first graph 1100 illustrating fastener loading characteristics associated with the third brace 502 resulting from the first and second vehicle impact events. The first graph 1100 includes a first graph axis (e.g., an x-axis) 1102 representing time (e.g., in seconds) and a second graph axis 1104 (e.g., a y-axis) representing a first force component (e.g., an x-component in N) that is applied to the third primary fastener 810 and directed along the first axis 110 shown in FIG. 1. The first force component is represented as a percentage of a peak or maximum load that is encountered by the primary fastener 810. The first graph 1100 of FIG. 11 also includes a first set of plots 1106, each of which represents the first force component over time during the first vehicle impact event at different locations of the third primary fastener 810 (e.g., a top of the third primary fastener 810, a bottom of the third primary fastener 810, and/or one or more sections between the top and bottom of the third primary fastener 810). Further, the first graph 1100 also includes a second set of plots 1108, each of which represents the first force component over time during the second vehicle impact event at the different locations of the third primary fastener 810. Movement of the first and second sets of plots 1106, 1108 is from left to right in the orientation of FIG. 11.

Figure 12:
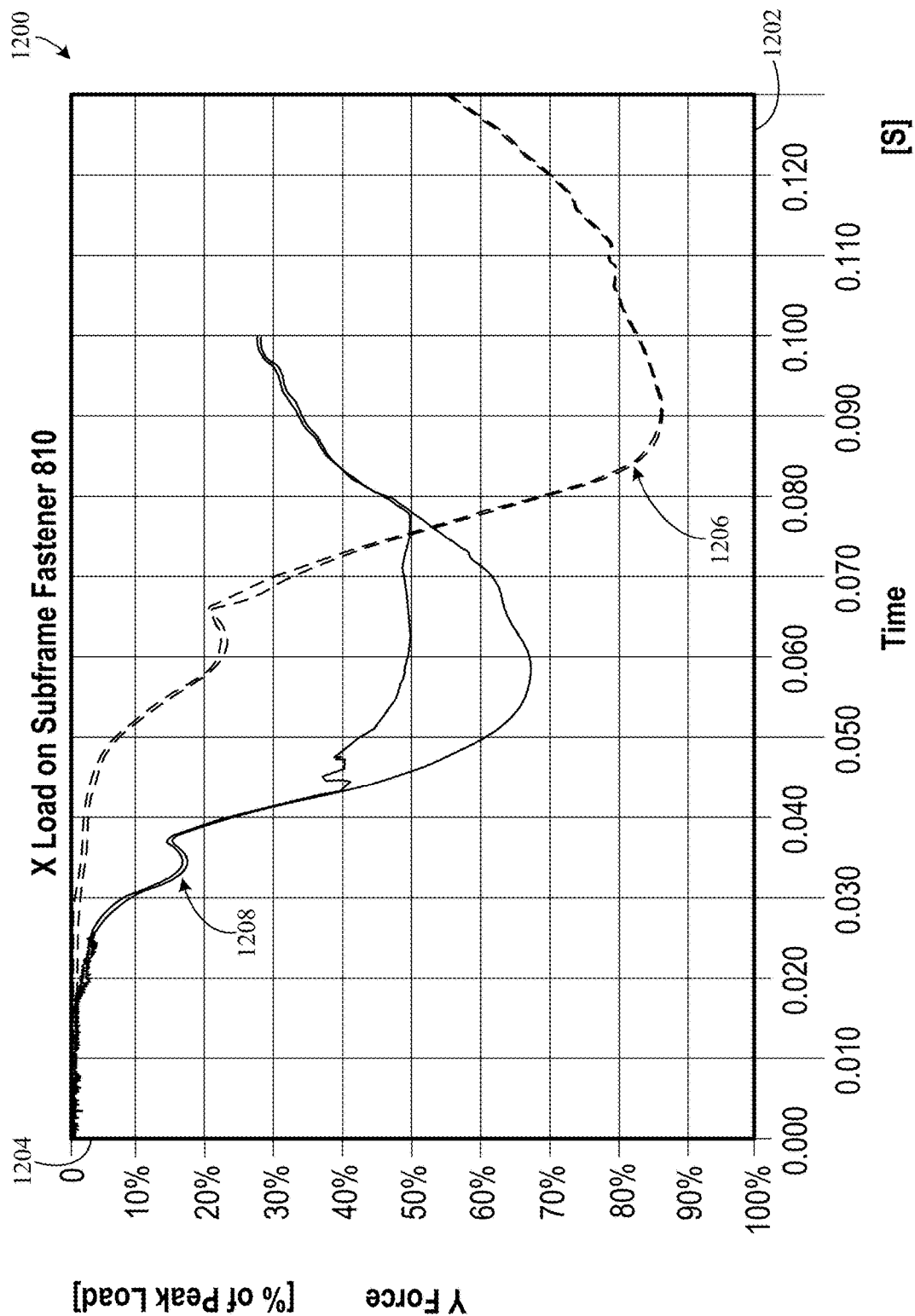

FIG. 12 shows a second graph 1200 illustrating fastener loading characteristics associated with the third brace 502 resulting from the first and second vehicle impact events. The second graph 1200 includes a third graph axis (e.g., an x-axis) 1202 representing time (e.g., in seconds) and a fourth graph axis 1204 (e.g., a y-axis) representing a second force component (e.g., a y-component in N) that is applied to the third primary fastener 810 and directed along the second axis 112 shown in FIG. 1. The second force component is represented as a percentage of a peak or maximum load that is encountered by the primary fastener 810. Further, the second force component is different relative to the first force component. The second graph 1200 of FIG. 12 also includes a third set of plots 1206, each of which represents the second force component over time during the first vehicle impact event at the different locations of the third primary fastener 810. Further, the second graph 1200 also includes a fourth set of plots 1208, each of which represents the second force component over time during the second vehicle impact event at the different locations of the third primary fastener 810. Movement of the third and fourth sets of plots 1206, 1208 is from left to right in the orientation of FIG. 12.

Figure 13:
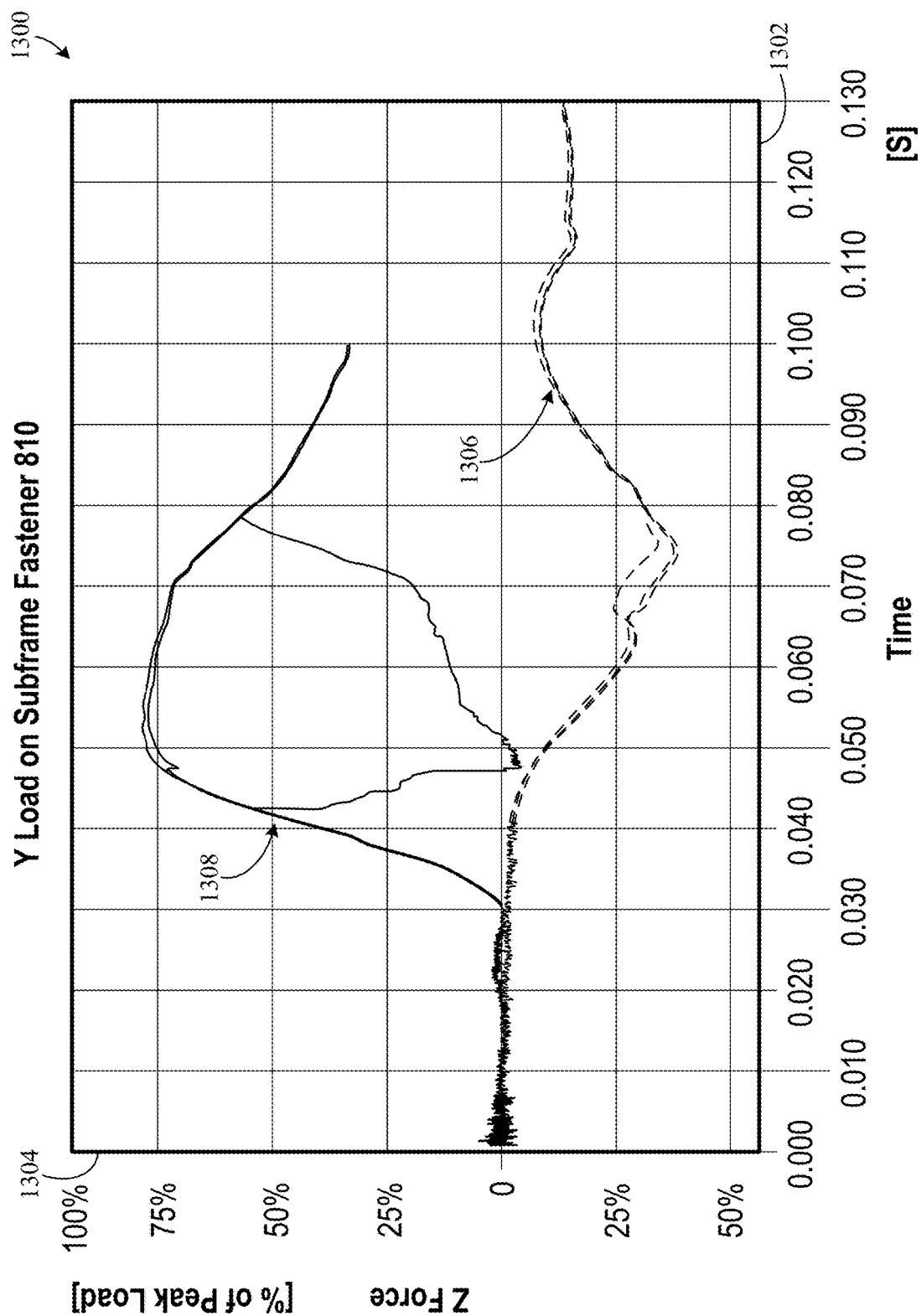

FIG. 13 shows a third graph 1300 illustrating fastener loading characteristics associated with the third brace 502 resulting from the first and second vehicle impact events. The third graph 1300 includes a fifth graph axis (e.g., an x-axis) 1302 representing time (e.g., in seconds) and a sixth graph axis 1304 (e.g., a y-axis) representing a third force component (e.g., a z-component in N) that is applied to the third primary fastener 810 and directed along the third axis 114 shown in FIG. 1. The third force component is represented as a percentage of a peak or maximum load that is encountered by the primary fastener 810. Further, the third force component is different relative to the first and second force components. The third graph 1300 of FIG. 13 also includes a fifth set of plots 1306, each of which represents the third force component over time during the first vehicle impact event at the different locations of the third primary fastener 810. Further, the third graph 1300 also includes a sixth set of plots 1308, each of which represents the third force component over time during the second vehicle impact event at the different locations of the third primary fastener 810. Movement of the fifth and sixth sets of plots 1306, 1308 is from left to right in the orientation of FIG. 13. In particular, as shown in FIG. 13, a loading direction of the third primary fastener 810 is different or opposite in first vehicle impact event compared to the second vehicle impact event. For example, the third force component is directed in an inboard direction relative to the vehicle 100 during the first vehicle impact event. Whereas, during the second vehicle impact event, the third force component is direction in an outboard direction relative to the vehicle 100.

As used herein, the terms "including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

It will be appreciated that the systems, apparatus, and methods disclosed in the foregoing description provide numerous advantages. Examples disclosed herein provide one or more example braces configured to advantageously control subframe motion of a vehicle subframe during any and/or all frontal impact scenarios. Some disclosed examples provide an example brace that can achieve separation in desired crash modes and maintain connection in the other crash modes such that no compromise is made between cabin intrusion and deceleration pulse.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A vehicle assembly, comprising:
a subframe of a vehicle;
a vehicle body structure; and
a brace attaching the subframe to the vehicle body structure, a body of the brace including a first end coupled to the subframe and a second end coupled to the vehicle body structure,
wherein:
the first end of the body is configured to remain connected to the subframe during an offset frontal vehicle impact event in which the subframe applies a first load to the first end,
the first end of the body is configured to separate from the subframe during a full frontal vehicle impact event in which the subframe applies a second load to the first end, and
the body of the brace is shaped to have a first stiffness along a first axis corresponding to a direction of the first load, and wherein the body is shaped to have a second stiffness along a second axis, different from the first axis, corresponding to a direction of the second load, the second stiffness being substantially greater than the first stiffness.

2. The vehicle assembly of claim 1, wherein the body of the brace is asymmetric.

3. The vehicle assembly of claim 1, wherein, when the first load is greater than or equal to a threshold load, the body of the brace is configured to deform along a body line that is substantially perpendicular to the first axis.

4. The vehicle assembly of claim 1, wherein, when the second load is greater than or equal to a threshold load, the body of the brace is configured to deform along a body line that is substantially perpendicular to the second axis.

5. The vehicle assembly of claim 1, wherein the first axis and the second axis are angled relative to each other.

6. The vehicle assembly of claim 1, wherein the brace includes a first stiffening flange coupled to a first side of the body and positioned adjacent the first end.

7. The vehicle assembly of claim 6, wherein the brace includes a second stiffening flange coupled to a second side of the body, opposite to the first side, and positioned adjacent the first end.

8. The vehicle assembly of claim 7, wherein the first and second stiffening flanges extend along the body of the brace away from the first end of the body.

9. The vehicle assembly of claim 7, wherein each of the first and second stiffening flanges has a length that is less than a length of the body.

10. The vehicle assembly of claim 7, wherein the brace includes a stress relief notch formed by (a) an end of the first stiffening flange and the first side of the body or (b) an end of the second stiffening flange and the second side of the body.

11. The vehicle assembly of claim 7, wherein the first and second stiffening flanges are configured to concentrate stress from the second load in a target area of the body adjacent to an attachment point of the brace.

12. The vehicle assembly of claim 1, further including a fastener coupling the first end of the body to the subframe, wherein, during the full frontal vehicle impact event, the subframe is configured to urge the fastener to move relative to the body such that the fastener (a) forms a tear on a portion of the body adjacent the fastener and (b) passes through the tear to disconnect the fastener from the portion of the body.

13. The vehicle assembly of claim 1, wherein the brace is a first brace and the body is a first body, further including a second brace attaching the subframe to the vehicle body structure, a second body of the second brace including a first end coupled to the subframe and a second end coupled to the vehicle body structure, the first end of the second body configured to (a) remain connected to the subframe during the offset frontal vehicle impact event and (b) separate from the subframe during the full frontal vehicle impact event.

14. A subframe brace for a vehicle, comprising:
a brace body including a first terminal portion coupled to a subframe of the vehicle and a second terminal portion, opposite to the first terminal portion, coupled to a body structure of the vehicle, the brace body configured to have (a) a first deformation mode in which the brace body deforms along a first body line and (b) a second deformation mode in which the brace body deforms along a second body line different from the first body line, wherein:

in response to a first load applied to the first terminal portion by the subframe exceeding a first threshold load, the first deformation mode activates to reduce an amount of cabin intrusion associated with the vehicle, and in response to a second load, different from the first load, applied to the first terminal portion by the subframe exceeding a second threshold load, the second deformation mode activates to reduce a deceleration pulse input to an occupant of the vehicle.

15. The subframe brace of claim 14, wherein the second deformation mode includes tearing.

16. The subframe brace of claim 14, further including a structural feature arranged along a side of the brace body and configured to concentrate stress from the first or second load in a target area of the brace body corresponding to the first or second body line.

17. The subframe brace of claim 16, wherein the structural feature includes a flange or a notch.

18. The subframe brace of claim 14, wherein the brace body includes a first wall portion, a second wall portion, and a base portion connected between the first and second wall portions, the first and second wall portions extending away from a surface of the base portion to define a recess in the brace body.

19. A vehicle, comprising:

a subframe;

a body structure; and a brace attaching the subframe to the body structure, a body of the brace including a first end coupled to the subframe and a second end coupled to the body structure, wherein:

the first end of the body is configured to remain connected to the subframe during a first vehicle impact event in which the subframe applies a first load to the first end, the first end of the body is configured to separate from the subframe during a second vehicle impact event in which the subframe applies a second load to the first end different relative to the first load, and the body of the brace is shaped to have a first stiffness along a first axis corresponding to a direction of the first load, and wherein the body is shaped to have a second stiffness along a second axis, different from the first axis, corresponding to a direction of the second load, the second stiffness being substantially greater than the first stiffness.

* * * * *